US012647982B2

(12) United States Patent
Yang et al.

(10) Patent No.: US 12,647,982 B2
(45) Date of Patent: Jun. 2, 2026

(54) DETERMINATION FOR UCI MULTIPLEXING

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 810 days.

(21) Appl. No.: 17/662,792

(22) Filed: May 10, 2022

(65) Prior Publication Data

US 2022/0377731 A1     Nov. 24, 2022

Related U.S. Application Data

(60) Provisional application No. 63/187,118, filed on May 11, 2021.

(51) Int. Cl.
H04W 4/00 (2018.01)
H04W 72/21 (2023.01)
H04W 72/56 (2023.01)

(52) U.S. Cl.
CPC ........... H04W 72/21 (2023.01); H04W 72/56 (2023.01)

(58) Field of Classification Search
CPC .............................. H04W 72/21; H04W 72/56
See application file for complete search history.

(56) References Cited

U.S. PATENT DOCUMENTS

| | | | | |
|---|---|---|---|---|
| 10,827,516 | B2 * | 11/2020 | Huang | .................... H04L 5/001 |
| 12,382,448 | B2 * | 8/2025 | Huang | .................. H04L 1/1671 |
| 2019/0230688 | A1 * | 7/2019 | Huang | .................. H04L 5/0091 |
| 2021/0120547 | A1 * | 4/2021 | Seo | ...................... H04L 27/2636 |
| 2023/0318748 | A1 * | 10/2023 | Yin | ........................ H04L 1/1854 |
| | | | | 370/329 |
| 2023/0354313 | A1 * | 11/2023 | Yin | ........................ H04L 1/1854 |
| 2024/0129921 | A1 * | 4/2024 | Choi | .................. H04W 72/1273 |
| 2024/0380513 | A1 * | 11/2024 | Jung | ..................... H04L 1/0013 |

FOREIGN PATENT DOCUMENTS

KR     10-2020-0135724     * 10/2020

* cited by examiner

*Primary Examiner* — Edan Orgad
*Assistant Examiner* — Hidayat Dabiri
(74) *Attorney, Agent, or Firm* — Norton Rose Fulbright US LLP

(57)     ABSTRACT
This disclosure provides systems, methods, and devices for wireless communication that support physical uplink control channel (PUCCH) resource set determination for multiplexing uplink control information (UCI) messages of different priorities in a wireless communication system. In particular, a user equipment (UE) determines to multiplex a high-priority (HP) UCI message of a first size and a low-priority (LP) UCI message of a second size for a multiplexed PUCCH based on a reference UCI payload size different from a sum of the first and second sizes. The reference UCI payload size is based on a sum of the first size and the second size with a weight factor applied to the first size, second size, or both, or is based on a sum of the first size and a reference second size. The resource set from which the multiplexed PUCCH resource is selected is determined based on the reference UCI payload size.

29 Claims, 7 Drawing Sheets

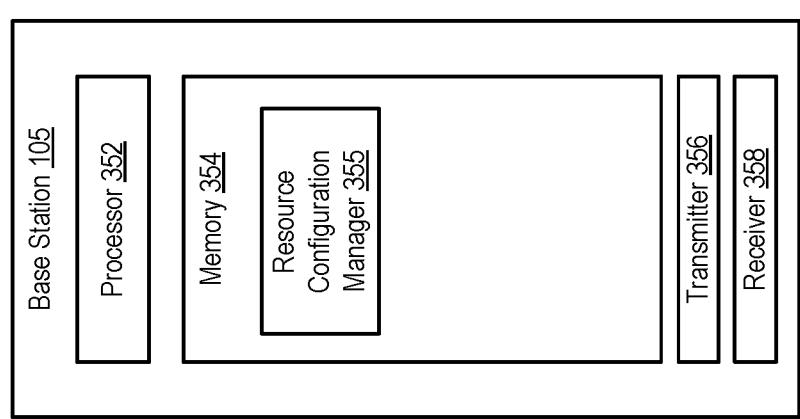
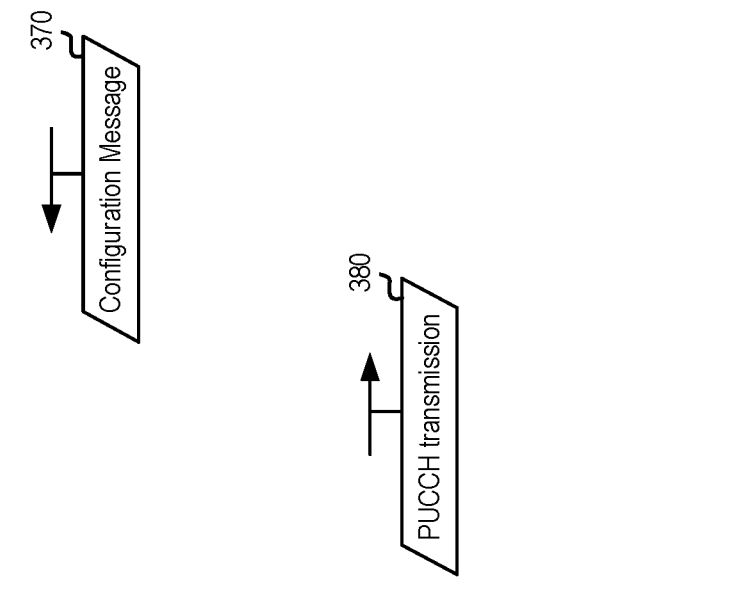
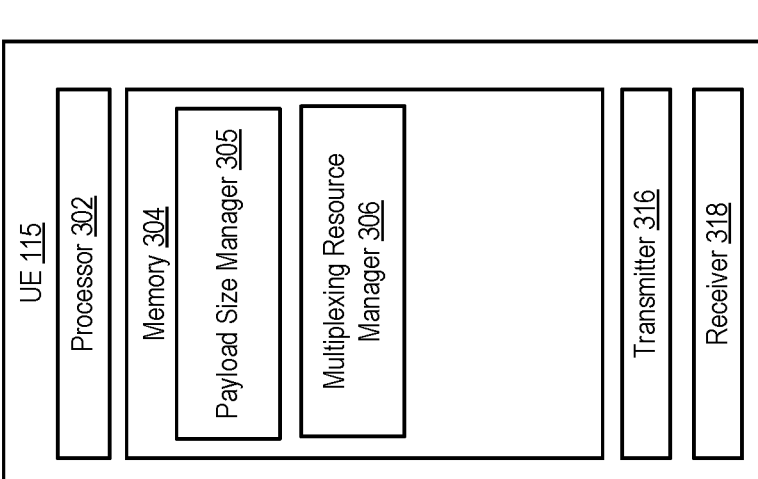
*FIG. 3*

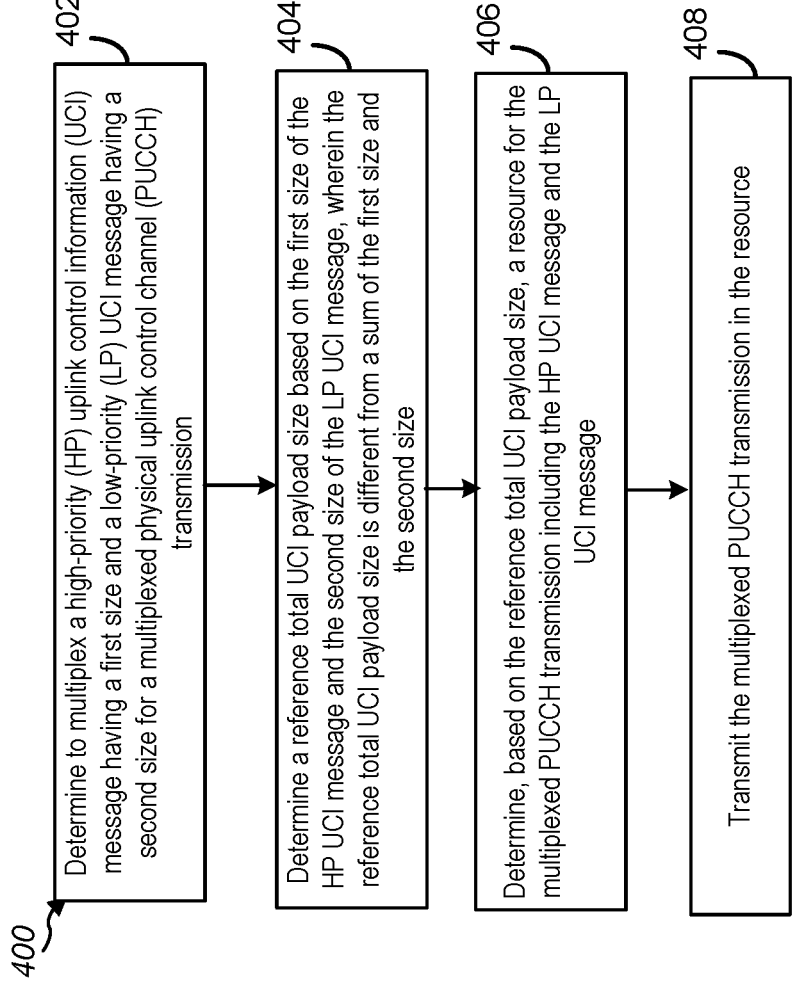

400

402

Determine to multiplex a high-priority (HP) uplink control information (UCI) message having a first size and a low-priority (LP) UCI message having a second size for a multiplexed physical uplink control channel (PUCCH) transmission

404

Determine a reference total UCI payload size based on the first size of the HP UCI message and the second size of the LP UCI message, wherein the reference total UCI payload size is different from a sum of the first size and the second size

406

Determine, based on the reference total UCI payload size, a resource for the multiplexed PUCCH transmission including the HP UCI message and the LP UCI message

408

Transmit the multiplexed PUCCH transmission in the resource

FIG. 4

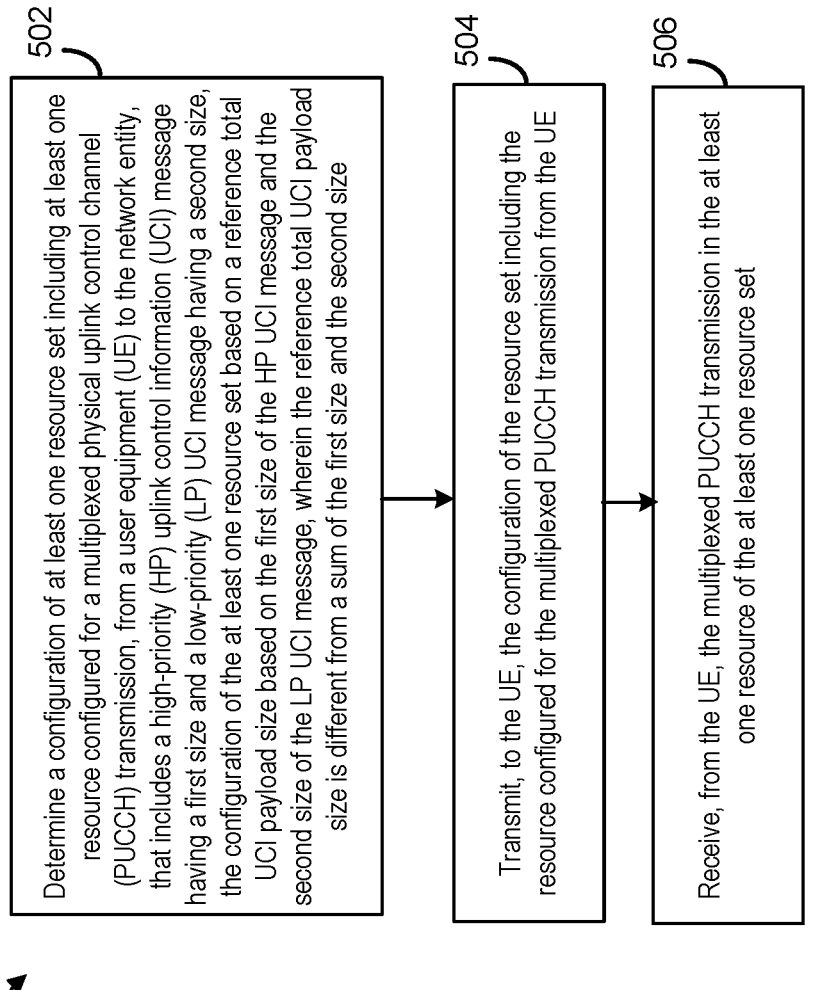

Determine a configuration of at least one resource set including at least one resource configured for a multiplexed physical uplink control channel (PUCCH) transmission, from a user equipment (UE) to the network entity, that includes a high-priority (HP) uplink control information (UCI) message having a first size and a low-priority (LP) UCI message having a second size, the configuration of the at least one resource set based on a reference total UCI payload size based on the first size of the HP UCI message and the second size of the LP UCI message, wherein the reference total UCI payload size is different from a sum of the first size and the second size

502

Transmit, to the UE, the configuration of the resource set including the resource configured for the multiplexed PUCCH transmission from the UE

504

Receive, from the UE, the multiplexed PUCCH transmission in the at least one resource of the at least one resource set

DETERMINATION FOR UCI MULTIPLEXING

CROSS-REFERENCE TO RELATED APPLICATIONS

This application claims the benefit of U.S. Provisional Patent Application No. 63/187,118, entitled, "Determination for UCI Multiplexing," filed on May 11, 2021, which is expressly incorporated by reference herein in its entirety.

TECHNICAL FIELD

Aspects of the present disclosure relate generally to wireless communication systems, and more particularly, to resource set determinations for multiplexing high-priority uplink control information (UCI) and low-priority UCI.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining to multiplex a high-priority (HP) uplink control information (UCI) message having a first size and a low-priority (LP) UCI message having a second size for a multiplexed physical uplink control channel (PUCCH) transmission, and determining a reference total UCI payload size based on the first size of the HP UCI message and the second size of the LP UCI message. In aspects, the reference total UCI payload size is different from a sum of the first size and the second size. The method further includes determining, based on the reference total UCI payload size, a resource for the multiplexed PUCCH transmission including the HP UCI message and the LP UCI message, and transmitting, to a network entity, the multiplexed PUCCH transmission in the resource.

In an additional aspect of the disclosure, a method of wireless communication performed by a network entity includes determining a configuration of at least one resource set including at least one resource configured for a multiplexed PUCCH transmission, from a UE to the network entity, that includes an HP UCI message having a first size and an LP UCI message having a second size, the configuration of the at least one resource set based on a total UCI payload size range associated with a reference total UCI payload size that is different from a sum of the first size and the second size, transmitting, to the UE, the configuration of the at least one resource set including the at least one resource configured for the multiplexed PUCCH transmission from the UE, and receiving, from the UE, the multiplexed PUCCH transmission in the at least one resource of the at least one resource set.

In an additional aspect of the disclosure, a UE includes at least one processor and a memory coupled to the at least one processor. The at least one processor stores processor-readable code that, when executed by the at least one processor, is configured to perform operations including determining to multiplex an HP UCI message having a first size and an LP UCI message having a second size for a multiplexed PUCCH transmission, and determining a reference total UCI payload size based on the first size of the HP UCI message and the second size of the LP UCI message. In aspects, the reference total UCI payload size is different from a sum of the first size and the second size. The operations further include determining, based on the reference total UCI payload size, a resource for the multiplexed PUCCH transmission including the HP UCI message and the LP UCI message, and transmitting, to a network entity, the multiplexed PUCCH transmission in the resource.

In an additional aspect of the disclosure, a network entity includes at least one processor and a memory coupled to the at least one processor. The at least one processor stores processor-readable code that, when executed by the at least one processor, is configured to perform operations including determining a configuration of at least one resource set including at least one resource configured for a multiplexed PUCCH transmission, from a UE to the network entity, that includes an HP UCI message having a first size and an LP UCI message having a second size, the configuration of the at least one resource set based on a total UCI payload size range associated with a reference total UCI payload size that is different from a sum of the first size and the second size, transmitting, to the UE, the configuration of the at least one resource set including the at least one resource configured for the multiplexed PUCCH transmission from the UE, and receiving, from the UE, the multiplexed PUCCH transmission in the at least one resource of the at least one resource set.

In an additional aspect of the disclosure, a non-transitory computer-readable medium stores instructions that, when executed by a processor, cause the processor to perform operations. The operations include determining, by a UE, determining to multiplex an HP UCI message having a first size and an LP UCI message having a second size for a multiplexed PUCCH transmission, and determining a reference total UCI payload size based on the first size of the HP UCI message and the second size of the LP UCI message.

In aspects, the reference total UCI payload size is different from a sum of the first size and the second size. The operations further include determining, based on the reference total UCI payload size, a resource for the multiplexed PUCCH transmission including the HP UCI message and the LP UCI message, and transmitting, to a network entity, the multiplexed PUCCH transmission in the resource.

In an additional aspect of the disclosure, a non-transitory computer-readable medium stores instructions that, when executed by a processor, cause the processor to perform operations. The operations include determining, by a network entity, determining a configuration of at least one resource set including at least one resource configured for a multiplexed PUCCH transmission, from a UE to the network entity, that includes an HP UCI message having a first size and an LP UCI message having a second size, the configuration of the at least one resource set based on a total UCI payload size range associated with a reference total UCI payload size that is different from a sum of the first size and the second size, transmitting, to the UE, the configuration of the at least one resource set including the at least one resource configured for the multiplexed PUCCH transmission from the UE, and receiving, from the UE, the multiplexed PUCCH transmission in the at least one resource of the at least one resource set.

In an additional aspect of the disclosure, an apparatus includes means for determining, by a UE, to multiplex an HP UCI message having a first size and an LP UCI message having a second size for a multiplexed PUCCH transmission, and means for determining a reference total UCI payload size based on the first size of the HP UCI message and the second size of the LP UCI message. In aspects, the reference total UCI payload size is different from a sum of the first size and the second size. The apparatus further includes means for determining, based on the reference total UCI payload size, a resource for the multiplexed PUCCH transmission including the HP UCI message and the LP UCI message, and means for transmitting, to a network entity, the multiplexed PUCCH transmission in the resource.

In an additional aspect of the disclosure, an apparatus includes means for determining, by a network entity, a configuration of at least one resource set including at least one resource configured for a multiplexed PUCCH transmission, from a UE to the network entity, that includes an HP UCI message having a first size and an LP UCI message having a second size, the configuration of the at least one resource set based on a total UCI payload size range associated with a reference total UCI payload size that is different from a sum of the first size and the second size, means for transmitting, to the UE, the configuration of the at least one resource set including the at least one resource configured for the multiplexed PUCCH transmission from the UE, and means for receiving, from the UE, the multiplexed PUCCH transmission in the at least one resource of the at least one resource set.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram of an example wireless communications system that supports physical uplink control channel (PUCCH) resource set determination for multiplexing uplink control information (UCI) messages of different priorities in a wireless communication system according to one or more aspects.

FIG. 4 is a flow diagram illustrating an example process that supports PUCCH resource set determination for multiplexing UCI messages of different priorities according to one or more aspects.

FIG. 5 is a flow diagram illustrating an example process that supports PUCCH resource set determination for multiplexing UCI messages of different priorities according to one or more aspects.

Like reference numbers and designations in the various drawings indicate like elements.

DETAILED DESCRIPTION

Figure 1:
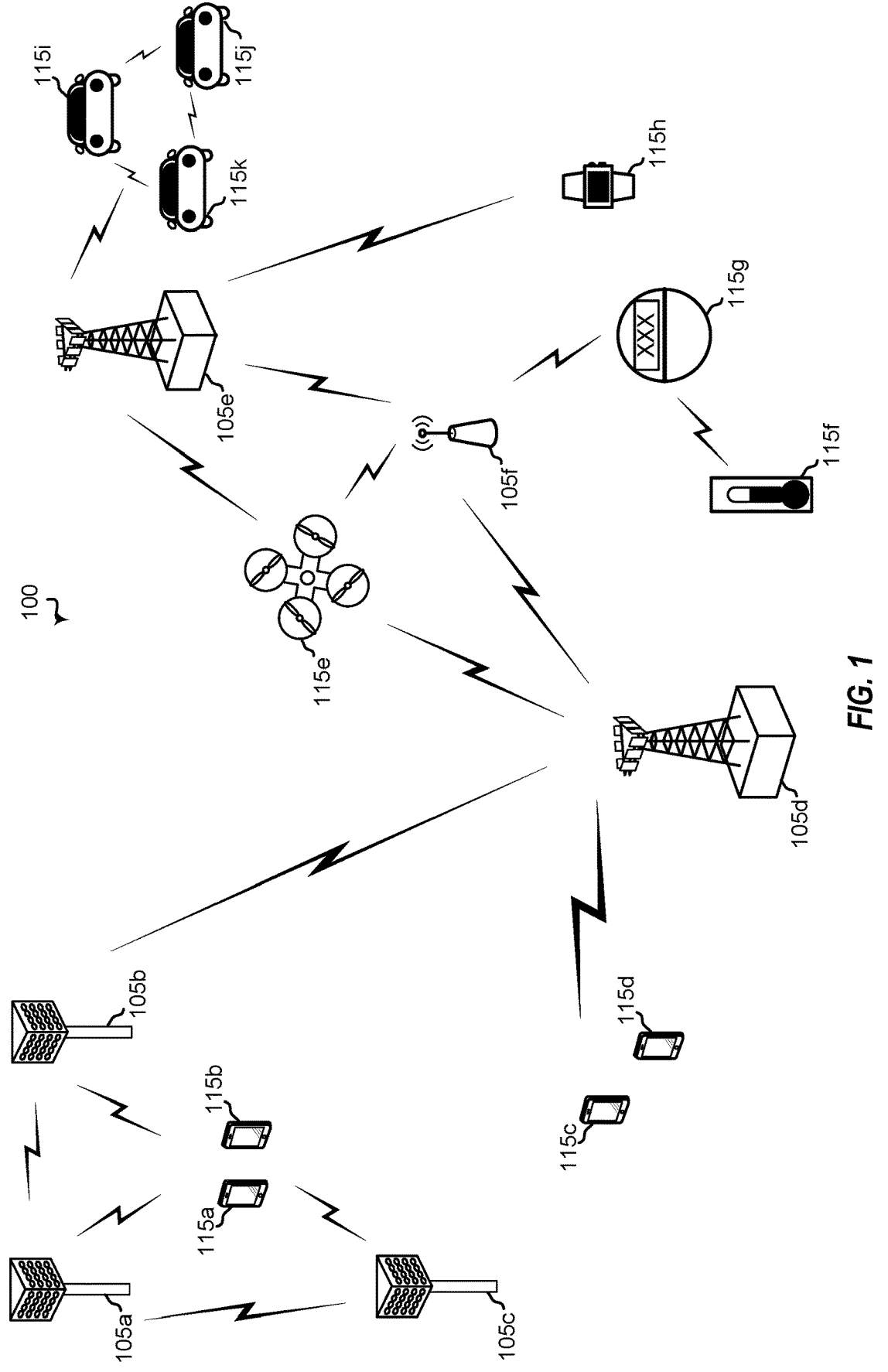
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure relate to techniques that support physical uplink control channel (PUCCH) resource set determination for multiplexing uplink control information (UCI) messages of different priorities in a wireless communication system. In particular, in aspects of the present disclosure, a user equipment (UE) may be configured or scheduled to multiplex a high-priority (HP) UCI message and a low-priority (LP) UCI message for a multiplexed PUCCH transmission. The HP UCI message may have a first size, and the LP UCI message may have a second size. The UE may be configured to determine a reference total UCI payload size based on the first size and the second size, and may then determine a PUCCH resource set based on the reference total UCI payload size. In aspects, determining the reference total UCI payload size may include calculating a weighted sum of the first size and the second size based on at least one weight factor (also referred to herein as a "gamma factor") that is applied to either the first size, the second size, or both. In some aspects, determining the reference total UCI payload size may include calculating a sum of the first size and a reference second size. In these aspects, the reference second size is a reference LP UCI payload size that is different from the second size of the LP UCI message, and the sum of the first size and the reference second size may exclude the second size. In this manner, the reference total UCI payload size may be obtained by adding the actual size of the HP UCI payload size and a reference LP UCI payload size instead of the actual LP UCI payload size. In aspects, the UE may select a PUCCH resource from the PUCCH resource set and may transmit the multiplexed PUCCH transmission in the PUCCH resource selected from the PUCCH resource set.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

It should be understood that wireless network 100 of FIG. 1 shows an example network implementation to aid in understanding concepts of the present disclosure. The particular network entities and their configuration may differ from that of the example of FIG. 1 according to embodiments in accordance with concepts herein. Deployment of communication systems (e.g., 5G NR systems) may, for example, be arranged in multiple manners with various components or constituent parts. In a 5G NR system, or network, a network node, a mobility element of a network, a radio access network (RAN) node, a core network node, a network element, or a network equipment, such as a base station (BS), or one or more units (or one or more components) performing base station functionality, (each of which or component parts thereof may be referred to herein as "a network entity") may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
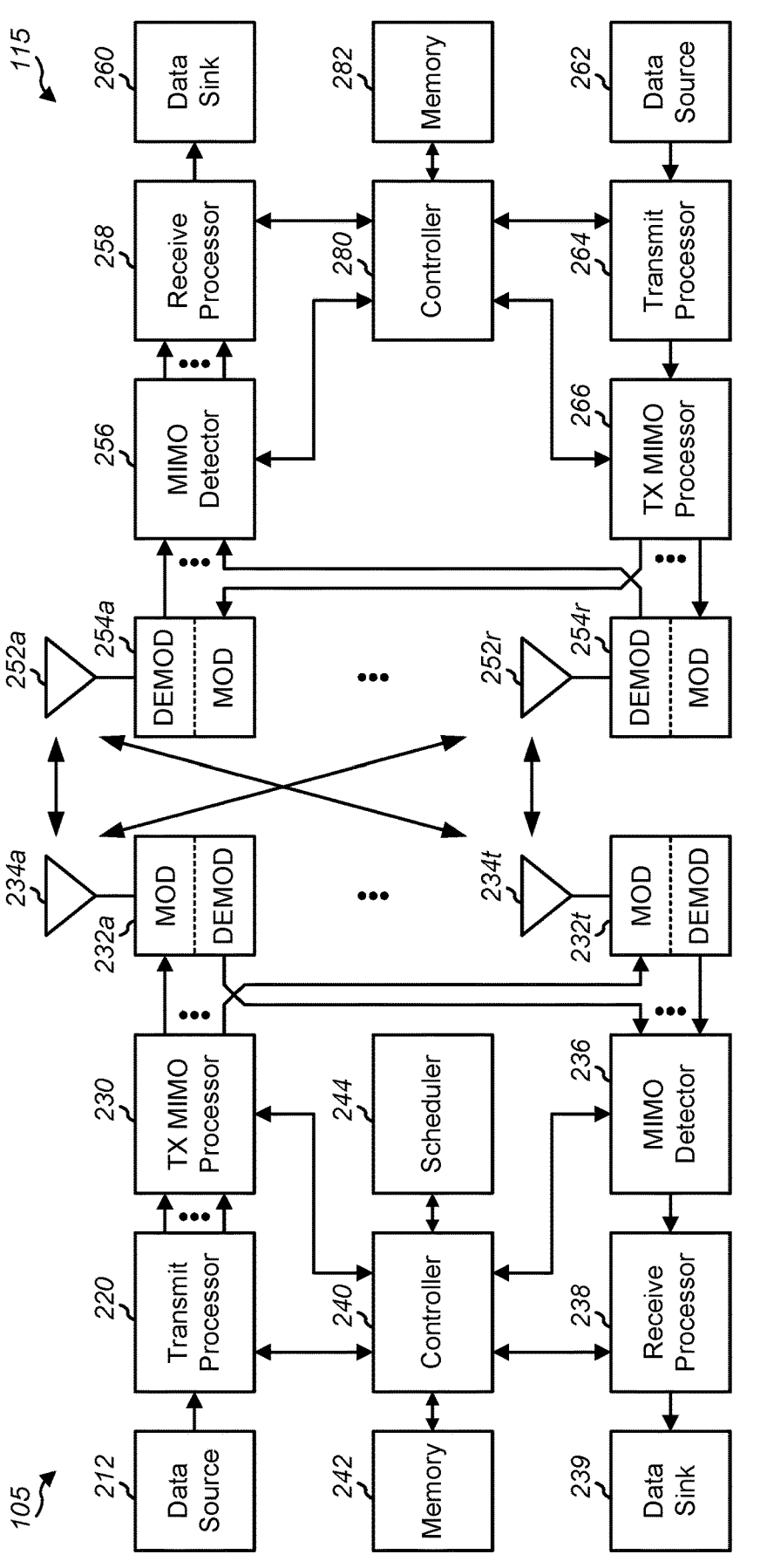
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current wireless communication systems, a base station may configure a UE with a number of PUCCH resources sets for transmitting a PUCCH message (e.g., an uplink transmission including an uplink control information (UCI) payload (or message)) to a base station. The base station may configure PUCCH resources in each of the PUCCH resource sets for transmitting the UCI payload. In implementations, a UCI payload size range may be associated with each of the PUCCH resources sets. For example, a first UCI payload size range (e.g., from $N_1$ up to $N_2$ UCI bits) may be associated with a first PUCCH resource set of the UE, a second UCI payload size range (e.g., from $N_2+1$ up to $N_3$ UCI bits) may be associated with a second PUCCH resource set, and so on, up to the configuration of the UE. In these cases, PUCCH resources in a PUCCH resource set may be able to accommodate a transmission of a UCI message of a particular size within the associated UCI payload size range.

In these implementations, when determining a PUCCH resource for transmitting a PUCCH message that includes a UCI message (or payload), a UE may first obtain a total UCI payload size of the UCI message. The UE may then determine a PUCCH resource set associated with the total UCO payload size. For example, the UE may determine a PUCCH resource set associated with a UCI payload size range within which the total UCI payload size of the UCI message falls, and may select the PUCCH resource set. The UE may then determine a PUCCH resource from the selected PUCCH resource set, based on, for example, the PUCCH resource indication (PRI) in a corresponding DCI associated with the UCI message (e.g., a PDSCH transmission for which a hybrid automatic repeat request (HARQ) feedback message is being included in the UCI message), for transmitting the PUCCH transmission including the UCI message.

In some implementations, the UCI message may include high-priority (HP) UCI and/or low-priority (LP) UCI. In situations in which collisions between HP UCI and LP UCI may occur (e.g., the PUCCH resource in which the UE may be scheduled to transmit the HP UCI message collides in time with the PUCCH resource in which the UE may be scheduled to transmit the LP UCI message), the UE may be configured to multiplex the HP UCI payload and the LP UCI payload on a same PUCCH resource. In these cases, the UE may separately encode the HP UCI message and the LP UCI message, using different coding rates, and may simply "piggyback" the multiplexed UCI on a PUCCH resource configured (e.g., by the base station for transmission of one of the UCI messages (e.g., the HP UCI message). However, the UE may still be required to determine the PUCCH resource in which to transmit the multiplexed UCI message, and this may entail obtaining a total UCI payload size of the multiplexed UCI transmission in order to determine a UCI payload size range to which the total UCI payload size belongs and the PUCCH resource set associated with the UCI payload size range. The UE may then select a resource from the PUCCH resource set for the multiplexed UCI message. Solutions that has been proposed for determining the PUCCH resource in which to transmit the multiplexed UCI message include determining the PUCCH resource using a total UCI payload size for the multiplexed UCI transmission based on the UCI payload sizes of the LP UCI message and the HP UCI message. In these cases, the total UCI payload size may represent a simple sum of the LP UCI payload size and the HP UCI payload size. In another proposal, the UE may be configured to determine the PUCCH resource using the UCI payload size of the HP UCI message, without considering the size of the LP UCI message, for the multiplexed UCI transmission. However, there are drawbacks and problems associated with these proposed solutions, as discussed in the following.

As mentioned above, a base station may configure PUCCH resources in each of the PUCCH resource sets configured for a UE for transmitting a UCI message. When the base station configures a PUCCH resource in a PUCCH resource set for transmitting a UCI message, the base station may configure the PUCCH resource to be associated with a UCI payload size in a range $K_L < K \leq K_{L'}$ and a particular coding rate r. In this case, the PUCCH resource may be configured to include a set of resource elements (REs) that includes between $K_L/r$ and $K_{L'}/r$ REs for the PUCCH resource set. This allows the base station to configure a PUCCH resource to be sufficiently flexible to accommodate a transmission of between $$\left[\frac{K_L}{r}, \frac{K_U}{r}\right]$$

REs. In some cases, such as when the UCI payload size exceeds $K_U$, a PUCCH resource in a different PUCCH resource set may be used.

The above process for configuring PUCCH resources in the PUCCH resource sets may be straightforward for a UCI message that include a single type of UCI message (e.g., LP UCI or HP UCI). However, when a PUCCH resource in a PUCCH resource set may be used for a multiplexed PUCCH UCI (e.g., including HP UCI and LP UCI), the number of REs required to transmit the multiplex UCI payload not only may depend on the total UCI payload size (e.g., the HP UCI payload size and the LP UCI payload size), but may also depend on the number of HP UCI bits and LP UCI bits included in the multiplexed UCI payload. As the HP UCI payload and the LP UCI payload may be encoded using different coding rates, a different number of REs may be required to transmit the same size of HP UCI payload and LP UCI payload. For example, the coding rate used to encode the LP UCI payload may be three times the coding rate used to encode the HP UCI payload. In this case, it may take three times more REs to communicate one bit of HP UCI payload than to communicate one bit of LP UCI payload. As such, in this example, the resources for delivering K bits of HP UCI may be three times larger than the resources for delivering K bits of LP UCI. Thus, configuring PUCCH resources in a PUCCH resource set based on a total UCI payload may create inefficiencies.

In another example, if the base station allocates or configures a PUCCH resource in a PUCCH resource set based on the LP UCI size, the base station may allocate a smaller number of REs in each resource than may be required for delivering the HP UCI payload. In this case, the HP transmission may be affected, which may not be accepted as the HP communication may be a critical communication.

Various aspects of the present disclosure relate to techniques that support PUCCH resource set determination for multiplexing UCI messages of different priorities in a wireless communication system. In particular, in aspects of the present disclosure, a UE may be configured or scheduled to multiplex an HP UCI message and an LP UCI message for a multiplexed PUCCH transmission. The HP UCI message may have a first size, and the LP UCI message may have a second size. The UE may be configured to determine a reference total UCI payload size based on the first size and the second size, and may then determine a PUCCH resource set based on the reference total UCI payload size. In aspects, determining the reference total UCI payload size may include calculating a weighted sum of the first size and the second size based on at least one weight factor (also referred to herein as a "gamma factor") that is applied to either the first size, the second size, or both. In some aspects, determining the reference total UCI payload size may include calculating a sum of the first size and a reference second size. In these aspects, the reference second size is a reference LP UCI payload size that is different from the second size of the LP UCI message, and the sum of the first size and the reference second size may exclude the second size. In this manner, the reference total UCI payload size may be obtained by adding the actual size of the HP UCI payload size and a reference LP UCI payload size instead of the actual LP UCI payload size. In aspects, the UE may select a PUCCH resource from the PUCCH resource set and may transmit the multiplexed PUCCH transmission in the PUCCH resource selected from the PUCCH resource set.

FIG. 3 is a block diagram of an example wireless communications system 300 that supports PUCCH resource set determination for multiplexing UCI messages of different priorities in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store payload size manager 305 and multiplexing resource manager 306. In aspects, payload size manager 305 may be configured to perform operations for determining UCI payloads. For example, payload size manager 305 may be configured to determine a UCI payload size for a HP UCI message and/or an LP UCI message. In aspects, payload size manager 305 may be configured to determine a reference total UCI payload for a multiplexed UCI message (e.g., a UCI message in a PUCCH transmission that multiplexes an HP UCI payload and an LP UCI payload). In some aspects, determining the reference total UCI payload size may include calculating a weighted sum of the HP UCI payload size and the LP UCI payload size based on at least one weight factor. In aspects, the weight factor, also referred to herein as a gamma factor, may include a factor that is applied to the HP UCI payload size, the LP UCI payload size, or both. After applying the weight factor, the terms are added together to obtain the weighted sum. In some aspects, determining the reference total UCI payload may include calculating a sum of the actual size of the HP UCI payload size and a reference LP UCI payload size, instead of the actual LP UCI payload size.

In aspects, multiplexing resource manager 306 may be configured to determine a PUCCH resource set and a PUCCH resource within the PUCCH resource set in which to multiplex the HP UCI payload and the LP UCI payload, based on the reference total UCI payload size determined by the payload size manager 305, and to multiplex the HP UCI payload and the LP UCI payload in the determined PUCCH resource.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more receive processor 238, transmit processor 220, and controller 240, and memory 354 includes or corresponds to memory 242.

Memory 354 includes or is configured to store resource configuration manager 355. In aspects, resource configuration manager 355 may be configured to perform operations for configuring PUCCH resource sets and PUCCH resources within a PUCCH resource set in accordance with aspects of the present disclosure. In particular, resource configuration manager 355 may be configured to perform operations for associating a PUCCH resource set with a UCI payload size range and for allocating a number of REs to each of the PUCCH resources within a PUCCH resource set in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 transmits a configuration message 370 to UE 115. In aspects, configuration message 370 may include configuration information related to determining a PUCCH resource and/or PUCCH resource set for multiplexing an HP UCI payload of an HP UCI message and an LP UCI payload of an LP UCI message together. For example, base station 105 may transmit, in configuration message 370, an indication of a weight factor that UE 115 may use when determining a PUCCH resource set for transmitting a UCI message to base station 105. In alternative or additional aspects, base station 105 may transmit, in configuration message 370, an indication of a reference LP UCI payload size that UE 115 may use when determining a PUCCH resource set for transmitting a UCI message to base station 105. In aspects, the HP UCI message and/or the LP UCI message may include one or more of various types of UCI, such as HARQ feedback, a scheduling request (SR) message, low-priority channel state information (CSI) and/or high-priority CSI, etc.

During operation of wireless communications system 300, UE 115 determines to multiplex an HP UCI message and an LP UCI message. For example, a PUCCH resource in which UE 115 may be scheduled to transmit the HP UCI message may collide in time with a PUCCH resource in which UE 115 may be scheduled to transmit the LP UCI message. Due to this collision, UE 115 may determine to multiplex the HP UCI message and the LP UCI message in a same PUCCH resource (e.g., a multiplexed PUCCH resource for a multiplexed PUCCH transmission including a multiplex of the LP UCI message and the HP UCI message). The HP UCI message may have a first HP UCI payload size, and the LP UCI message may have a second LP UCI payload size.

During operation of wireless communications system 300, UE 115 determines a PUCCH resource set from which to select a PUCCH resource for the multiplexed PUCCH transmission that is to include the HP UCI payload and the LP UCI payload. In aspects, the PUCCH resource set may include a plurality of PUCCH resource, and each resource of the plurality of resources may be configured to accommodate a UCI payload size and/or UCI type (e.g., HP UCI and/or LP UCI).

In aspects, determining the PUCCH resource set from the UE 115 may select the PUCCH resource for the multiplexed PUCCH transmission may include determining the PUCCH resource set based on a reference total UCI payload size. During operation, UE 115 determines the reference total UCI payload size based on the based on the first size of the HP UCI message and the second size of the LP UCI message. UE 115 may then determine the PUCCH resource set from which to select a PUCCH resource for the multiplexed PUCCH transmission based on the reference total UCI payload size.

In aspects, the reference total UCI payload size may be different from a sum of the first HP UCI payload size of the HP UCI message and the second LP UCI payload size of the LP UCI message. For example, typically, a UE may determine a PUCCH resource set based on the total UCI payload that includes a sum of the HP UCI payload size and the LP UCI payload size. However, as noted above, in accordance with aspects of the present disclosure, UE 115 may determine the PUCCH resource set based on a reference total UCI payload size that may be different from the sum of the HP UCI payload size and the LP UCI payload size. For example, given an HP UCI payload size $K_{HP}$, and an LP UCI payload size $K_{LP}$, UE 115 may be configured to determine the PUCCH resource set from which to select the PUCCH resource for the multiplexed PUCCH transmission based on a reference total UCI payload size that may be different from $K_{HP}+K_{LP}$. In particular aspects, the reference total UCI payload size may consider the difference in coding rates of the HP UCI payload and the LP UCI payload by calculating the reference total UCI payload size in a manner in which the portion of the reference total UCI payload size associated with the LP UCI payload size is equivalent to the HP UCI payload size, or by calculating the reference total UCI payload size in a manner in which base station 105 and UE 115 have the same understanding as to which LP UCI size is to be used in calculating the total size of the multiplexed UCI message. These features may allow a the UE to determine the PUCCH resource set and the base station may leverage existing approaches to configure the PUCCH resources in the PUCCH resource sets.

In a particular aspect, UE 115 may determine the reference total UCI payload size used in determining the PUCCH resource set from which to select the PUCCH resource for the multiplexed PUCCH transmission in accordance with aspects of the present disclosure by calculating a weighted sum of the HP UCI payload size $K_{HP}$ and the LP UCI payload size $K_{LP}$ based on at least one weight factor (e.g., a gamma factor $\gamma$). For example, in some aspects, calculating the weighted sum K of the HP UCI payload size $K_{HP}$ and the LP UCI payload size $K_{LP}$ based on the at least one weight factor $\gamma$ may include applying the at least one weight factor $\gamma$ to the HP UCI payload size $K_{LP}$. In these aspects, in one example, the weighted sum K of the HP UCI payload size $K_{HP}$ and the LP UCI payload size $K_{LP}$ may be calculated by UE 115 by adding the HP UCI payload size $K_{HP}$ to the result of the ratio of the LP UCI payload size $K_{LP}$ to the at least one weight factor $\gamma$. UE 115 may then use the weighted sum K, as described above, to determine the PUCCH resource set from which to select a PUCCH resource for the multiplexed PUCCH transmission. In these aspects, the at least one weight factor $\gamma$ may be greater than one. Equation 1 below illustrates this example for calculating the weighted sum K of embodiments.

$$K = K_{HP} + \frac{K_{LP}}{\gamma} \qquad \text{(Equation 1)}$$

In some aspects, the ratio of $K_{LP}/\gamma$ may be rounded to the ceiling of the ratio (see Equation 2 below) or the floor of the ratio (see Equation 3 below). For example where $K_{LP}=11$ and $\gamma=3$, the ratio of $K_{LP}/\gamma$ may be rounded up to the ratio's ceiling 4, or may rounded down to the ratio's floor 3. In any case, the rounded ratio of $K_{LP}/\gamma$ may be added to the HP UCI payload size $K_{HP}$ to obtain the weighted sum K that UE 115 may use to determine the PUCCH resource set from which to select the PUCCH resource in which to transmit the multiplexed PUCCH transmission.

$$K = K_{HP} + \left\lceil \frac{K_{LP}}{\gamma} \right\rceil \qquad \text{(Equation 2)}$$

$$K = K_{HP} + \left\lfloor \frac{K_{LP}}{\gamma} \right\rfloor \qquad \text{(Equation 3)}$$

In other aspects, the weighted sum of the HP UCI payload size and the LP UCI payload size may be calculated by UE 115 by adding the HP UCI payload size to the result of multiplying the LP UCI payload size by the at least one weight factor. UE 115 may then use the weighted sum, as described above, to determine the PUCCH resource set from which to select a PUCCH resource for the multiplexed PUCCH transmission. Equation 4 below illustrates this example for calculating the weighted sum K of embodiments.

$$K = K_{HP} + \gamma \cdot K_{LP} \qquad \text{(Equation 4)}$$

In other aspects, the result of the multiplication of $K_{LP}$ and $\gamma$ may be rounded to the ceiling of the multiplication result (see Equation 5 below) or the floor of the multiplication result (see Equation 6 below). For example where $K_{LP}=11$ and $\gamma=0.5$, the multiplication result of multiplying $K_{LP}$ and $\gamma$ may be rounded up to the multiplication result's ceiling 6, or may rounded down to the multiplication result's floor 5. In any case, the rounded multiplication result may be added to the HP UCI payload size $K_{HP}$ to obtain the weighted sum that UE 115 may use to determine the PUCCH resource set from which to select the PUCCH resource in which to transmit the multiplexed PUCCH transmission.

$$K = K_{HP} + \lceil \gamma \cdot K_{LP} \rceil \qquad \text{(Equation 5)}$$

$$K = K_{HP} + \lfloor \gamma \cdot K_{LP} \rfloor \qquad \text{(Equation 6)}$$

In some aspects, calculating the weighted sum of the HP UCI payload size $K_{HP}$ and the LP UCI payload size $K_{LP}$ based on the at least one weight factor $\gamma$ may include applying the at least one weight factor $\gamma$ to the LP UCI payload size $K_{HP}$. In these aspects, in one example, the weighted sum K of the HP UCI payload size $K_{HP}$ and the LP UCI payload size $K_{LP}$ may be calculated by UE 115 by adding the LP UCI payload size $K_{LP}$ to the result of the ratio of the HP UCI payload size $K_{HP}$ to the at least one weight factor $\gamma$. UE 115 may then use the weighted sum K, as described above, to determine the PUCCH resource set from which to select a PUCCH resource for the multiplexed PUCCH transmission. In these aspects, the at least one weight factor $\gamma$ may be greater than one. Equation 7 below illustrates this example for calculating the weighted sum K of embodiments.

$$K = \frac{K_{HP}}{\gamma} + K_{LP} \qquad \text{(Equation 7)}$$

In some aspects, the ratio of $K_{HP}/\gamma$ may be rounded to the ceiling of the ratio (see Equation 8 below) or the floor of the ratio (see Equation 9 below). For example where $K_{HP}=11$ and $\gamma=3$, the ratio of $K_{HP}/\gamma$ may be rounded up to the ratio's ceiling 4, or may rounded down to the ratio's floor 3. In any case, the rounded ratio of $K_{HP}/\gamma$ may be added to the LP UCI payload size $K_{LP}$ to obtain the weighted sum K that UE 115 may use to determine the PUCCH resource set from which to select the PUCCH resource in which to transmit the multiplexed PUCCH transmission.

$$K = \left\lceil \frac{K_{HP}}{\gamma} \right\rceil + K_{LP} \qquad \text{(Equation 8)}$$

$$K = \left\lfloor \frac{K_{HP}}{\gamma} \right\rfloor + K_{LP} \qquad \text{(Equation 9)}$$

In other aspects, the weighted sum of the HP UCI payload size and the LP UCI payload size may be calculated by UE 115 by adding the LP UCI payload size to the result of multiplying the HP UCI payload size by the at least one weight factor. UE 115 may then use the weighted sum, as described above, to determine the PUCCH resource set from which to select a PUCCH resource for the multiplexed PUCCH transmission. Equation 4 below illustrates this example for calculating the weighted sum K of embodiments.

$$K = \gamma \cdot K_{HP} + K_{LP} \qquad \text{(Equation 10)}$$

In other aspects, the result of the multiplication of $K_{HP}$ and $\gamma$ may be rounded to the ceiling of the multiplication result (see Equation 11 below) or the floor of the multiplication result (see Equation 12 below). For example where $K_{HP}=11$ and $\gamma=0.5$, the multiplication result of multiplying $K_{HP}$ and $\gamma$ may be rounded up to the multiplication result's ceiling 6, or may rounded down to the multiplication result's floor 5. In any case, the rounded multiplication result may be added to the LP UCI payload size $K_{LP}$ to obtain the weighted sum that UE 115 may use to determine the PUCCH resource set from which to select the PUCCH resource in which to transmit the multiplexed PUCCH transmission.

$$K=\lceil\gamma\cdot K_{HP}\rceil+K_{LP} \qquad \text{(Equation 11)}$$

$$K=\lfloor\gamma\cdot K_{LP}\rfloor+K_{HP} \qquad \text{(Equation 12)}$$

In some aspects, calculating the weighted sum of the HP UCI payload size $K_{HP}$ and the LP UCI payload size $K_{LP}$ based on the at least one weight factor $\gamma$ may include applying a first weight factor $\gamma_1$ to the HP UCI payload size $K_{HP}$ and a second weight factor $\gamma_2$ to the LP UCI payload size $K_{LP}$. In these aspects, the weighted sum K of the HP UCI payload size $K_{HP}$ and the LP UCI payload size $K_{LP}$ may be calculated by UE 115 by adding the result of applying the first weight factor $\gamma_1$ to the HP UCI payload size $K_{HP}$ and the result of applying the second weight factor $\gamma_2$ to the LP UCI payload size $K_{LP}$. UE 115 may then use the weighted sum K, as described above, to determine the PUCCH resource set from which to select a PUCCH resource for the multiplexed PUCCH transmission. Equation 13 below illustrates this example for calculating the weighted sum K of embodiments $$K=\gamma_1 K_{HP}+\gamma_2 K_{LP} \qquad \text{(Equation 13)}$$

In aspects, the first weight factor $\gamma_1$ and/or the second weight factor $\gamma_2$ may be less than one, or greater than or equal to one. In some aspects, either the result of applying the first weight factor $\gamma_1$ to the HP UCI payload size $K_{HP}$, the result of applying the second weight factor $\gamma_2$ to the LP UCI payload size $K_{LP}$, or both results may be rounded up to the ceiling of the multiplication result, or may be rounded down to the floor of the multiplication result, as described above with respect to Equations 5, 6, 11, and 12.

In aspects, UE may determine the reference total UCI payload size to be equal to the weighted sum K described above with respect to Equations 1-13.

In aspects, the at least one weight factor that is applied to the sum of the HP UCI payload size and the LP UCI payload size to determine the reference total UCI payload size may include a value that is radio resource control (RRC)-configured by the base station (e.g., base station 105). For example, in aspects, base station 105 may send a message to UE 115 including at least one RRC command configuring UE 115 with the at least one weight factor that UE 115 may select and apply to the to the sum of the HP UCI payload size and the LP UCI payload size to calculate the weighted sum that is used to determine the reference total UCI payload size. As noted above, UE 115 may then use the reference total UCI payload size to determine a PUCCH resource set from which to select a PUCCH resource for the multiplexed PUCCH transmission. In some aspects, the RRC configuration of the at least one weight factor by the base station may include a configuration applicable to each PUCCH resource set that is configured for the UE. In other aspects, the RRC configuration of the at least one weight factor by the base station may include a configuration applicable to the UCI payload size ranges to which the HP UCI payload size and the LP UCI payload size may belong. In these cases, UE 115 may be configured to determine to which UCI payload size ranges each of the HP UCI payload size and the LP UCI payload size belong to, and based on the UCI payload size ranges of each of the HP UCI payload size and the LP UCI payload size, UE 115 may select, from a plurality of weight factors, the value of the at least one weight factor to use. Table 1 below illustrates an example of a configuration of a plurality of weight factors and how each weight factor may be selected based on the UCI payload size ranges of each of the HP UCI payload size and the LP UCI payload size.

TABLE 1

| Example of a configuration of a plurality of weight factors $\gamma$ and associated UCI payload size ranges | | | |
|---|---|---|---|
| $\gamma$ | $K_{HP} \le 2$ | $2 < K_{HP} \le 11$ | $K_{HP} > 11$ |
| $K_{LP} \le 2$ | 1 | 1 | 1 |
| $2 < K_{LP} \le 11$ | $\gamma_2$ | $\gamma_4$ | $\gamma_6$ |
| $K_{LP} > 11$ | $\gamma_3$ | $\gamma_5$ | $\gamma_7$ |

As seen in the example configuration of Table 1, when the LP UCI payload size $K_{LP}\le 2$ and the HP UCI payload size $K_{HP}\le 2$, a weight factor $\gamma=1$ may be used by UE 115 when determining the reference total UCI payload size in accordance with aspects described herein. As seen in Table 1, as long as $K_{LP}\le 2$ is true, UE 115 may be configured to select a weight factor $\gamma=1$. However, when $K_{HP}\le 2$ and $2<K_{LP}\le 11$, UE 115 may select a weight factor $\gamma=\gamma_2$. Similarly, Table 1 provides details on the configuration of UE 115 to select different weight factors depending on the UCI payload ranges to which the LP UCI payload size and the HP UCI payload size belongs to. In some aspects, with respect to the weight factor values shown in Table 1, $\gamma_2\le\gamma_3$, $\gamma_4\le\gamma_5$, $\gamma_6\le\gamma_7$, $\gamma_2\ge\gamma_4\ge\gamma_6$, and $\gamma_3\ge\gamma_5\ge\gamma_7$.

As noted above, the plurality of weight factors (e.g., the plurality of weight factors illustrated in Table 1) may be RRC configured for UE 115. In some aspects, a different configuration for the plurality of weight factors may be provided for UE 115 by base station 105.

It should be appreciated that Table 1 merely illustrates an example of a configuration of a plurality of weight factors that may be configured for a UE and the UCI payload ranges that may be configured for selecting the various weight factors. However this example should not be construed as limiting in any way. It should be appreciated that other configuration of weight factors and UCI payload ranges may be used. For example, in some cases, the UCI payload ranges illustrated may be combined (e.g., the $[K_{LP}\le 2]$ and the $[2<K_{LP}\le 11]$ UCI payload ranges may be combined into a single UCI payload range $[K_{LP}\le 11]$) in which case the plurality of weight factors applicable may be different.

In aspects, the at least one weight factor that is applied to the sum of the HP UCI payload size and the LP UCI payload size to determine the reference total UCI payload size may include a value that is determined based on coding rates associated with the HP UCI payload and the LP UCI payload. For example, in aspects, the HP UCI message and the LP UCI message may be originally scheduled to be transmitted in a respective PUCCH resource (e.g., before the LP UCI payload and the HP payload are determined to be multiplexed due to the collision of the respective PUCCH resources). These original PUCCH resources of the LP UCI payload and the HP payload may be associated with a respective LP coding rate $r_{LP}$ (e.g., the coding rate configured for encoding the LP UCI message) and a respective HP coding rate $r_{HP}$ (e.g., the coding rate configured for encoding the HP UCI message). In aspects, the at least one weight factor $\gamma$ may be obtained by the ratio of the LP coding rate $r_{LP}$ to the HP coding rate $r_{HP}$. In these aspects, UE 115 may determine the at least one weight factor $\gamma$=to $r_{LP}/r_{HP}$.

In aspects, UE 115 may be configured to determine, whether to obtain the at least one weight factor based on an RRC configuration dependent on the UCI payload size ranges of the LP UCI payload size and the HP UCI payload size or based on the coding rates associated with the HP UCI payload and the LP UCI payload, based on the total sum of the LP UCI payload size and the HP UCI payload size. In these aspects, when the total sum of the LP UCI payload size and the HP UCI payload size is within a first range, UE 115 may determine the at least one weight factor from the RRC configured plurality of weight factors based on the UCI payload ranges to which the LP UCI payload size and the HP UCI payload size belong to, as described above with respect to the non-limiting example of Table 1. When the total sum of the LP UCI payload size and the HP UCI payload size is within a second range different from the first range, UE 115 may determine the at least one weight factor based on the ratio ($r_{LP}/r_{HP}$) of the LP coding rate $r_{LP}$ to the HP coding rate $r_{HP}$.

In another particular aspect, UE 115 may determine the reference total UCI payload size used in determining the PUCCH resource set from which to select the PUCCH resource for the multiplexed PUCCH transmission in accordance with aspects of the present disclosure by calculating a sum (e.g., a weighted sum or an unweighted sum) of the HP UCI payload size $K_{HP}$ and a reference LP UCI payload size $K_{LP,ref}$. In aspects, the sum of the HP UCI payload size $K_{HP}$ and a reference LP UCI payload size $K_{LP,ref}$ may exclude the LP UCI payload size $K_{LP}$. In some aspects, the reference LP UCI payload size $K_{LP,ref}$ may be a value that is different than the LP UCI payload size $K_{LP}$, and may be a value that is dependent from the LP UCI payload size $K_{LP}$, or independent from the LP UCI payload size $K_{LP}$.

Before describing further details of the a reference LP UCI payload size $K_{LP,ref}$ approach described above, it is noted that this approach may be useful in addressing problems that arise from a potential misalignment in the UCI payload size expected by the base station and the UCI payload size actually sent by the UE. Typically, a payload size of a UCI (and the size of the PUCCH resource in which the UCI may be transmitted to the base station) is determined by the number of downlink grants that the UE may receive prior to transmitting the UCI message include feedback (e.g., HARQ feedback). For example, when a UE receives five downlink grants for five PDSCH transmissions from the base station, the base station may expect, and the UE may report, five HARQ feedback bits, typically. However, for HP and LP UCI reporting, associated downlink grants may be counted separately. More specifically, the payload size of a HARQ-ACK codebook may be determined by the corresponding DCI. For example, the UE may receive three LP downlink grants (e.g., eMBB downlink grant) even though the base station may transmit four LP downlink grants. This is because LP communication may be less reliable (e.g., bad channel or wrong decoding). In this case then, the base station may expect an LP HARQ feedback codebook that includes four bits, but the UE may report an LP HARQ feedback codebook that includes only three bits. Without multiplexing the HP UCI with the LP UCI, this may not be significant problem for the LP communication. However, when the LP UCI is multiplexed with the HP UCI, this misalignment between the base station and the UE with respect to the LP communication may affect the HP UCI traffic. For example, the UE may determine a total UCI payload size for the multiplexed UCI based on the incorrect LP UCI size, and may select a PUCCH resource based on the incorrectly computed total multiplexed UCI payload size. The base station may determine a different PUCCH resource, as the base station determines a different total multiplexed UCI payload size, thereby creating mismatch that may affect the HP transmission.

It is noted that the above issue may arise when the LP UCI (e.g., HARQ feedback) is configured with a Type-2 HARQ feedback codebook (also known as dynamic HARQ feedback codebook). Generally, the above issues may not arise when the LP UCI (e.g., HARQ feedback) is configured with a Type-1 HARQ feedback codebook (also known as semi-static HARQ feedback codebook). In aspects, the In other words, depending on whether the LP HARQ-ACK is Type-1 or Type-2, the UE may use different method to compute the reference total payload size.

The above potential issues may be addressed by aspects of the present disclosure. As noted above, UE 115 may determine the reference total UCI payload size used in determining the PUCCH resource set from which to select the PUCCH resource for the multiplexed PUCCH transmission in accordance with aspects of the present disclosure by calculating a sum (e.g., a weighted sum or an unweighted sum) of the HP UCI payload size $K_{HP}$ and a reference LP UCI payload size $K_{LP,ref}$ that is different from the actual LP UCI payload size $K_{LP}$.

It is noted that the above issue may arise when the LP UCI (e.g., HARQ feedback) is configured with a Type-2 HARQ feedback codebook (also known as dynamic HARQ feedback codebook). Generally, the above issues may not arise when the LP UCI (e.g., HARQ feedback) is configured with a Type-1 HARQ feedback codebook (also known as semi-static HARQ feedback codebook). In aspects, UE 115 may be configured to determine the reference total UCI payload size used in determining the PUCCH resource set from which to select the PUCCH resource for the multiplexed PUCCH transmission in accordance with aspects of the present disclosure by calculating a sum (e.g., a weighted sum or an unweighted sum) of the HP UCI payload size $K_{HP}$ and a reference LP UCI payload size $K_{LP,ref}$ when the LP UCI (e.g., HARQ feedback) is configured with a Type-2 HARQ feedback codebook. Otherwise, when the LP UCI (e.g., HARQ feedback) is configured with a Type-1 HARQ feedback codebook, UE 115 may apply a different technique for calculating the reference total UCI payload size.

In aspects, the reference LP UCI payload size $K_{LP,ref}$ may be previously determined and/or configured and may be known to both UE 115 and base station 105. In aspects, the reference LP UCI payload size $K_{LP,ref}$ may be a fixed value. For example, in aspects, the reference LP UCI payload size $K_{LP,ref}$ may be fixed to a value of 1 or 2. In this case, although the problems arising from the misalignment problem described above may be addressed, where the actual LP UCI payload size $K_{LP}$ is significantly greater than one, there may be inefficiencies in selecting a PUCCH resource.

In other aspects, the reference LP UCI payload size $K_{LP,ref}$ may be a quantized value. In aspects the reference LP UCI payload size $K_{LP,ref}$ may be set to a quantized value by first configuring a set of reference integer values {$K_0$, $K_1$, $K_2$, . . . , $K_M$}. UE 115 may then select an intermediate reference LP UCI payload size, which in some aspects the intermediate reference LP UCI payload size may be equal to the LP UCI payload size $K_{LP}$. In aspects, the intermediate reference LP UCI payload size may be rounded down to a largest value from the set of reference integer values that is less than the intermediate reference LP UCI payload size to obtain the quantized reference LP UCI payload size $K_{LP,ref}$. For example, given an intermediate reference LP UCI payload size between $K_1$ and $K_2$, UE 115 may obtain a quantized reference LP UCI payload size $K_{LP,ref}$ by rounding the intermediate reference LP UCI payload size down to $K_1$. In other aspects, the intermediate reference LP UCI payload size may be rounded up to a largest value from the set of reference integer values that is greater than the intermediate reference LP UCI payload size to obtain the quantized reference LP UCI payload size $K_{LP,ref}$. For example, given an intermediate reference LP UCI payload size between $K_1$ and $K_2$, UE 115 may obtain a quantized reference LP UCI payload size $K_{LP,ref}$ by rounding the intermediate reference LP UCI payload size down to $K_2$. In still other aspects, the intermediate reference LP UCI payload size may be rounded up or down to the nearest reference integer values in the set of reference integer values to obtain the quantized reference LP UCI payload size $K_{LP,ref}$.

In aspects, the reference LP UCI payload size $K_{LP,ref}$ may be based on the actual LP UCI payload size $K_{LP}$. In these aspects, for example, UE 115 may obtain a ratio of the actual LP UCI payload size $K_{LP}$ to a rounding factor L. In aspects, the rounding factor L may be obtained or configured to round the actual LP UCI payload size $K_{LP}$ to an integer multiple of some number to obtain the reference LP UCI payload size $K_{LP,ref}$. For example, in some aspects, the reference LP UCI payload size $K_{LP,ref}$ may be obtained from the ratio $K_{LP}/L$ rounded to the nearest integer. For example, where $K_{LP}=11$ and $L=3$, the reference LP UCI payload size $K_{LP,ref}$ may be set to the ratio $K_{LP}/L$ (11/3) rounded to the nearest integer 4. In aspects, the reference LP UCI payload size $K_{LP,ref}$ may be obtained from the ratio $K_{LP}/L$ rounded to the ceiling of the ratio and then multiplied by the rounding factor L in order to round the LP UCI payload size $K_{LP}$ to an integer multiple. For example, where $K_{LP}=11$ and $L=10$, the reference LP UCI payload size $K_{LP,ref}$ may be set to the ceiling of the ratio $K_{LP}/L$ (11/10)*L, which may yield 20. In this case, the LP UCI payload size $K_{LP}$ may be rounded to an integer multiple of 10s. In aspects, the reference LP UCI payload size $K_{LP,ref}$ may be obtained from the ratio $K_{LP}/L$ rounded to the floor of the ratio and then multiplied by the rounding factor L in order to round the LP UCI payload size $K_{LP}$ to an integer multiple. For example, where $K_{LP}=11$ and $L=10$, the reference LP UCI payload size $K_{LP,ref}$ may be set to the ceiling of the ratio $K_{LP/L}$ (11/10)*L, which may yield 10. In this case, the LP UCI payload size $K_{LP}$ may be rounded to an integer multiple of 10s.

During operation of wireless communications system 300, UE 115 determines the PUCCH resource set based on the reference total UCI payload size determined in accordance with aspects of the present disclosure. UE 115 may then select a PUCCH resource from the PUCCH resource set over which to multiplex the HP UCI payload and the LP UCI payload. In aspects, UE 115 may determine the PUCCH resource by obtaining a starting location in frequency and time of the selected PUCCH resource. In aspects, UE 115 may then calculate a number of resource blocks (RBs) that may be used for the PUCCH resource. UE 115 may calculate the number of RBs ($N_{RB}$) for the PUCCH resource in which the multiplexed UCI payload may be transmitted based on the HP UCI payload size $K_{HP}$ and the reference LP UCI payload size $K_{LP,ref}$ described above, rather than the actual LP UCI payload size $K_{LP}$, in accordance with the estimation formula 14 below.

$$N_{RB} \approx \frac{K_{LP,ref}}{R_{UCI}^{LP} * N_{RB}^{RE}} + \frac{K_{HP}}{R_{UCI}^{HP} * N_{RB}^{RE}}, \qquad \text{(Estimation formula 14)}$$

where $$N_{RB}^{RE}$$

is the number of REs in an RB, $$R_{UCI}^{LP}$$

is the coding rate of the originally scheduled PUCCH resource for transmitting the LP UCI message, and $$R_{UCI}^{HP}$$

is the coding rate of the originally scheduled PUCCH resource for transmitting the HP UCI message.

It is noted that the above estimation formula 14 is an estimation of the $N_{RB}$ as there are additional operations to be performed (e.g., modulo operations and some rounding operations in each of the addition terms in order to transform $N_{RB}$ into an integer value. For example, in some aspects, the addition terms in estimation formula 14 (e.g., $$\frac{K_{LP,ref}}{R_{UCI}^{LP} * N_{RB}^{RE}} \quad \text{and/or} \quad \frac{K_{HP}}{R_{UCI}^{HP} * N_{RB}^{RE}})$$

may represent an estimation of the LP RB size and HP RB size, respectively, and may result in non-integer or fractional values. In these cases, the LP RB size and the HP RB size, or in some cases the total sum of the LP RB size and the HP RB size, may be rounded up (e.g., obtaining a ceiling) to an integer value, rounded down (e.g., obtaining a ceiling) to an integer value, or may be rounded to a nearest integer value. In some aspects, determining the LP RB size (e.g., by $$\frac{K_{LP,ref}}{R_{UCI}^{LP} * N_{RB}^{RE}})$$

and determining the HP RB size (e.g., by $$\frac{K_{HP}}{R_{UCI}^{HP} * N_{RB}^{RE}})$$

may include determining an integer number of RBs for each of the LP RB size and the LP RB size, e.g., by rounding, rounding up, or rounding down the results of the respective operations.

During operation of wireless communications system 300, UE 115 transmits multiplexed PUCCH transmission 380. In aspects, PUCCH transmission 380 may include the multiplexed UCI message that includes the HP UCI payload of the HP UCI message and the LP UCI payload of the LP UCI message in the PUCCH resource of the PUCCH resource determined based on the reference total UCI payload size in accordance with aspects of the present disclosure.

Figure 6:
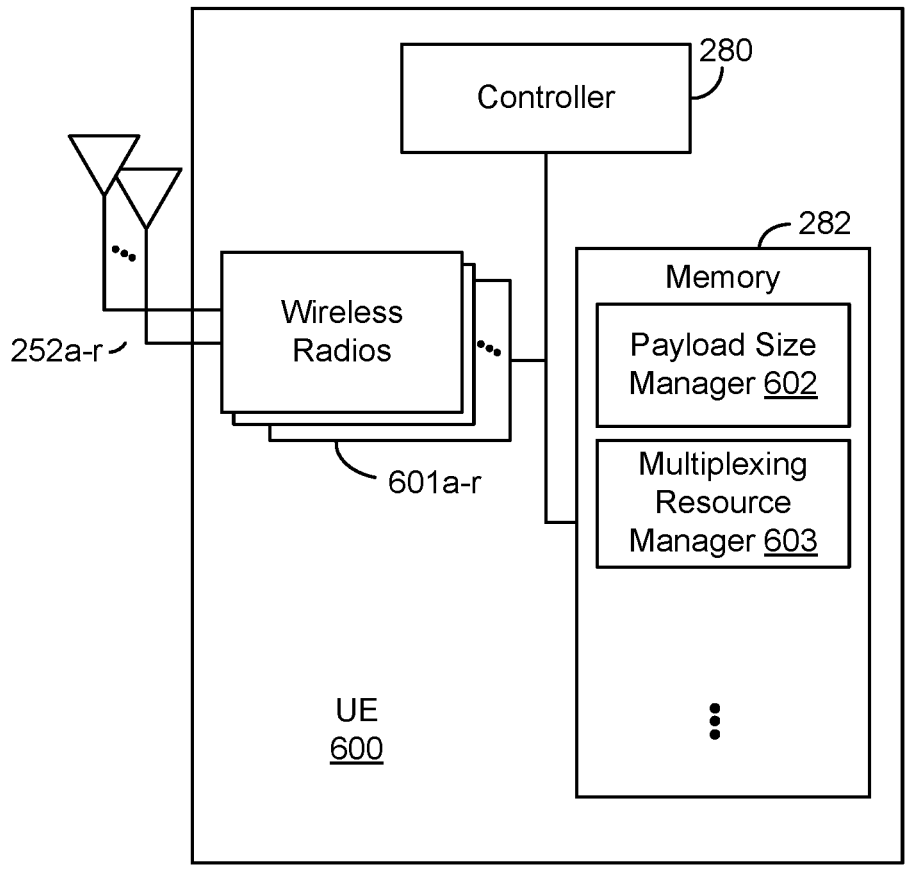
FIG. 6 is a block diagram of an example UE that supports PUCCH resource set determination for multiplexing UCI messages of different priorities according to one or more aspects.

FIG. 4 is a flow diagram illustrating an example process 400 that supports PUCCH resource set determination for multiplexing UCI messages of different priorities in a wireless communication system according to one or more aspects. Operations of process 400 may be performed by a UE, such as UE 115 described above with reference to FIGS. 1-3, or UE 600 described with reference to FIG. 6. For example, example operations (also referred to as "blocks") of process 400 may enable UE 115 to support PUCCH resource set determination for multiplexing UCI messages of different priorities. FIG. 6 is a block diagram illustrating UE 600 configured according to aspects of the present disclosure. UE 600 includes the structure, hardware, and components as illustrated for UE 115 of FIG. 2. For example, UE 600 includes controller/processor 280, which operates to execute logic or computer instructions stored in memory 282, as well as controlling the components of UE 600 that provide the features and functionality of UE 600. UE 600, under control of controller/processor 280, transmits and receives signals via wireless radios 601*a-r* and antennas 252*a-r*. Wireless radios 601*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 402 of process 400, a UE (e.g., UE 600) determines to multiplex an HP UCI message having a first size and an LP UCI message having a second size for a multiplexed PUCCH transmission. In order to implement the functionality for such operations, the UE, under control of controller/processor 280, executes multiplexing resource manager 603, stored in memory 282. The functionality implemented through the execution environment of multiplexing resource manager 603 allows for the UE to perform multiplexing related operations according to the various aspects herein. In aspects, determining to multiplex the HP UCI message and the LP UCI message may include determining a PUCCH resource collision. For example, a PUCCH resource in which UE 600 may be scheduled to transmit the HP UCI message may collide in time with a PUCCH resource in which UE 600 may be scheduled to transmit the LP UCI message. Due to this collision, UE 600 may determine to multiplex the HP UCI message and the LP UCI message in a same PUCCH resource (e.g., a multiplexed PUCCH resource for a multiplexed PUCCH transmission including a multiplex of the LP UCI message and the HP UCI message).

At block 404 of process 400, UE 600 determines a reference total UCI payload size based on the first size of the HP UCI message and the second size of the LP UCI message. In order to implement the functionality for such operations, the UE, under control of controller/processor 280, executes payload size manager 602, stored in memory 282. The functionality implemented through the execution environment of payload size manager 602 allows for the UE to perform UCI payload related operations according to the various aspects herein.

In some aspects, determining the reference total UCI payload size may include calculating a weighted sum of the HP UCI payload size and the LP UCI payload size based on at least one weight factor. The weight factor may be applied to the HP UCI payload size, the LP UCI payload size, or both. For example, in some aspects, UE 600 may apply the at least one weight factor to the second size and may add the result of applying the at least one weight factor to the second size to the first size to determine the weighted sum. In some aspects, UE 600 may apply the at least one weight factor to the first size and may add the result of applying the at least one weight factor to the first size to the second size to determine the weighted sum. In some aspects, UE 600 may apply a first weight factor of the at least one weight factor to the first size and a second weight factor of the at least one weight factor to the second size, and may add the result of applying the first weight factor to the first size to a result of applying the second weight factor to the second size to determine the weighted sum. In some aspects, applying a weight factor to the first size and/or the second size may include obtaining a weighted size based on the weight factor and then rounding the weighted size to an integer value.

In some aspects, the at least one weight factor may be selected from a plurality of RRC-configured values, in which each value is based on a range of the first size and a range of the second size. In these aspects, UE 600 may use the first size and the second size to determine the at least one weight factor to use in determining the weighted sum to be used for determining the reference total UCI payload size. In other aspects, the at least one weight factor may be obtained by calculating the at least one weight factor based on a ratio of a coding rate associated with the LP UCI message to a coding rate associated with the HP UCI message. In these aspects, the coding rate associated with the LP UCI message may be determined based on a coding rate of a PUCCH resource over which the LP UCI message is originally scheduled to be transmitted, and the coding rate associated with the HP UCI message may be determined based on a coding rate of a PUCCH resource over which the HP UCI message is originally scheduled to be transmitted. In still some other aspects, UE 600 may obtain the at least one weight factor using the plurality of RRC-configured values when the sum of the first size of the HP UCI message and the second size of the LP UCI message is within a first range, and may calculate the at least one weight factor based on the ratio of the coding rates associated with the LP UCI message and the HP UCI message when the sum of the first size of the HP UCI message and the second size of the LP UCI message is within a second range different from the first range.

In some aspects, determining the reference total UCI payload size may include calculating a sum of the actual size of the HP UCI payload size and a reference LP UCI payload size (or reference second size), instead of the actual LP UCI payload size. In these aspects, UE 600 may add the actual size of the HP UCI payload size and the reference LP UCI payload size together and may exclude the actual LP UCI payload size. In some aspects, this particular technique (e.g., calculating a sum of the first size and a reference second size to determine the reference total UCI payload size) may be used when the LP UCI message includes a dynamic Type 1 HARQ feedback message. Otherwise, other techniques for determining the reference total UCI payload size may be used. In some aspects, the reference second size may be one of a fixed integer value, a quantized reference value, or a rounded value relative to the second size of the LP UCI message.

At block 406 of process 400, UE 600 determines, based on the reference total UCI payload size, a resource for the multiplexed PUCCH transmission including the HP UCI message and the LP UCI message. In order to implement the functionality for such operations, the UE, under control of controller/processor 280, executes multiplexing resource manager 603, stored in memory 282. The functionality implemented through the execution environment of multiplexing resource manager 603 allows for the UE to perform multiplexing resources related operations according to the various aspects herein. In some aspects, UE 600 may determine a resource set using the reference total UCI payload size rather than using the actual sum of the HP UCI payload size and the LP UCI payload size. UE 600 may select the resource from within the resource set for the multiplexed PUCCH transmission. At block 408 of process 400, UE 600 transmits, to a network entity, the multiplexed PUCCH transmission in the resource.

Figure 7:
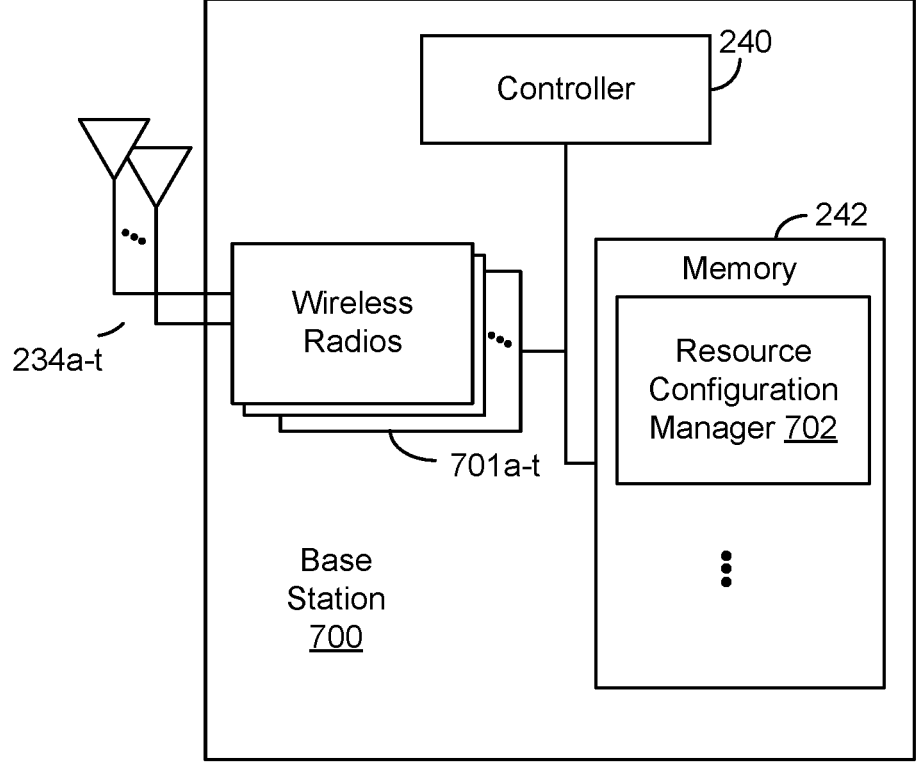
FIG. 7 is a block diagram of an example base station that supports PUCCH resource set determination for multiplexing UCI messages of different priorities according to one or more aspects.

FIG. 5 is a block diagram illustrating an example an example process 500 that supports PUCCH resource set determination for multiplexing UCI messages of different priorities in a wireless communication system according to one or more aspects. Operations of process 500 may be performed by a network entity, such as base station 105 described above with reference to FIGS. 1-3, or base station 700 described with reference to FIG. 7. FIG. 7 is a block diagram illustrating base station 700 configured according to one aspect of the present disclosure. Base station 700 includes the structure, hardware, and components as illustrated for base station 105 of FIG. 2. For example, base station 700 includes controller/processor 240, which operates to execute logic or computer instructions stored in memory 242, as well as controlling the components of base station 700 that provide the features and functionality of base station 700. Base station 700, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502, a network entity (e.g., base station 700) determines a configuration of at least one resource set including at least one resource configured for a multiplexed PUCCH transmission, from a UE (e.g., UE 600) to the network entity. In order to implement the functionality for such operations, base station 105, under control of controller/processor 240, executes resource configuration manager 702, stored in memory 242. The functionality implemented through the execution environment of resource configuration manager 702 allows for base station 105 to perform resource configuration operations according to the various aspects herein.

In aspects, the multiplexed PUCCH transmission may include an HP UCI message having a first size and an LP UCI message having a second size. The configuration of the at least one resource set may be based on a total UCI payload size range. For example, in some aspects, each resource set of the at least one resource set may be associated with a total UCI payload size range. In these aspects, a resource set may be configured for a multiplexed PUCCH transmission having a total UCI payload size that falls within a total UCI payload size range associated with the resource set. In aspects, base station 700 may configured the resources within each resource set for transmitting, from the UE, a UCI message (or a multiplexed UCI message) of particular sizes.

In some aspects, the network entity (e.g., base station 700) may configure the at least one resource set to be associated with a total UCI payload size range that is associated with a reference total UCI payload size that is different from a sum of the first size and the second size. For example, base station 700 may use a reference total UCI payload size when determining the UCI payload size ranges that may be associate with the at least one resource set. However, instead of using a sum of the UCI message payload sizes, base station 700 may use a weighted sum of the HP UCI message and the LP UCI message.

In some aspects, the reference total UCI payload size may include a weighted sum of the HP UCI payload size and the LP UCI payload size based on at least one weight factor. The weight factor may be applied to the HP UCI payload size, the LP UCI payload size, or both, as described above. After the weight factor is applied, the terms may be added together to obtain the weighted sum. In some aspects, applying a weight factor to the first size and/or the second size may include obtaining a weighted size based on the weight factor and then rounding the weighted size to an integer value.

In some aspects, the network entity (e.g., base station 700) may indicate to UE 600 the at least one weight factor to be used. For example, base station 700 may transmit to UE a plurality of RRC-configured values, in which each value is based on a range of the first size and a range of the second size, from which UE 600 may select a weight factor for determining reference total UCI payload size. In these aspects, UE 600 may use the first size and the second size to determine the at least one weight factor to use in determining the weighted sum to be used for determining the reference total UCI payload size. In other aspects, the at least one weight factor may be obtained by calculating the at least one weight factor based on a ratio of a coding rate associated with the LP UCI message to a coding rate associated with the HP UCI message. In these aspects, the coding rate associated with the LP UCI message may be determined based on a coding rate of a PUCCH resource over which the LP UCI message is originally scheduled to be transmitted, and the coding rate associated with the HP UCI message may be determined based on a coding rate of a PUCCH resource over which the HP UCI message is originally scheduled to be transmitted. In still some other aspects, the at least one weight factor may be determined from the plurality of RRC-configured values when the sum of the first size of the HP UCI message and the second size of the LP UCI message is within a first range, and may be calculated based on the ratio of the coding rates associated with the LP UCI message and the HP UCI message when the sum of the first size of the HP UCI message and the second size of the LP UCI message is within a second range different from the first range.

In some aspects, determining the reference total UCI payload size may include calculating a sum of the actual size of the HP UCI payload size and a reference LP UCI payload size (or reference second size), instead of the actual LP UCI payload size. In some aspects, this particular technique (e.g., calculating a sum of the first size and a reference second size to determine the reference total UCI payload size) may be used when the LP UCI message includes a dynamic Type 1 HARQ feedback message. Otherwise, other techniques for determining the reference total UCI payload size may be used. In some aspects, the reference second size may be one of a fixed integer value, a quantized reference value, or a rounded value relative to the second size of the LP UCI message.

At block 504, the network entity (e.g., base station 700) transmits, to the UE, the configuration of the at least one resource set including the at least one resource configured for the multiplexed PUCCH transmission from the UE. At block 506, the network entity (e.g., base station 700) receives, from the UE, the multiplexed PUCCH transmission in the at least one resource of the at least one resource set. In aspects, the resource set from which the resource over which the multiplexed PUCCH transmission is received from the UE may be a PUCCH resource of an HP resource set in which the HP UCI message is originally configured to be transmitted.

In one or more aspects, techniques for supporting PUCCH resource set determination for multiplexing UCI messages of different priorities in a wireless communication system according to one or more aspects may include additional aspects, such as any single aspect or any combination of aspects described below or in connection with one or more other processes or devices described elsewhere herein. In a first aspect, supporting PUCCH resource set determination for multiplexing UCI messages of different priorities in a wireless communication system may include an apparatus configured to determine to multiplex an HP UCI message having a first size and an LP UCI message having a second size for a multiplexed PUCCH transmission, and determine a reference total UCI payload size based on the first size of the HP UCI message and the second size of the LP UCI message. In this aspect, the reference total UCI payload size is different from a sum of the first size and the second size. The apparatus is further configured to determine, based on the reference total UCI payload size, a resource for the multiplexed PUCCH transmission including the HP UCI message and the LP UCI message, and to transmit, to a network entity, the multiplexed PUCCH transmission in the resource. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, determining the reference total UCI payload size based on the first size of the HP UCI message and the second size of the LP UCI message includes calculating a weighted sum of the first size and the second size based on at least one weight factor.

In a third aspect, alone or in combination with one or more of the first aspect or the second aspect, calculating a weighted sum of the first size and the second size based on at least one weight factor includes applying the at least one weight factor to the second size and adding a result of applying the at least one weight factor to the second size to the first size to determine the weighted sum.

In a fourth aspect, alone or in combination with the third aspect, calculating a weighted sum of the first size and the second size based on at least one weight factor includes applying the at least one weight factor to the first size and adding a result of applying the at least one weight factor to the first size to the second size to determine the weighted sum.

In a fifth aspect, alone or in combination with one or more of the third aspect through the fourth aspect, calculating a weighted sum of the first size and the second size based on at least one weight factor includes applying a first weight factor of the at least one weight factor to the first size and a second weight factor of the at least one weight factor to the second size, and adding a result of applying the first weight factor to the first size to a result of applying the second weight factor to the second size to determine the weighted sum.

In a sixth aspect, alone or in combination with one or more of the first aspect through the fifth aspect, applying the at least one weight factor to the first size includes obtaining a weighted first size based on the at least one weight factor and rounding the weighted first size to a first integer value.

In a seventh aspect, alone or in combination with the sixth aspect, applying the at least one weight factor to the second size includes obtaining a weighted second size based on the at least one weight factor and rounding the weighted second size to a second integer value.

In an eighth aspect, alone or in combination with one or more of the first aspect through the seventh aspect, the techniques of the first aspect includes obtaining the at least one weight factor by selecting the at least one weight factor from a plurality of RRC-configured values based on a range of the first size and a range of the second size.

In a ninth aspect, alone or in combination with one or more of the first aspect through the eighth aspect, the techniques of the first aspect includes obtaining the at least one weight factor by calculating the at least one weight factor based on a ratio of a coding rate associated with the LP UCI message to a coding rate associated with the HP UCI message.

In a tenth aspect, alone or in combination with one or more of the first aspect through the ninth aspect, the coding rate associated with the LP UCI message is determined based on a coding rate of a PUCCH resource over which the LP UCI message is originally scheduled to be transmitted.

In an eleventh aspect, alone or in combination with the tenth aspect, the coding rate associated with the HP UCI message is determined based on a coding rate of a PUCCH resource over which the HP UCI message is originally scheduled to be transmitted.

In a twelfth aspect, alone or in combination with one or more of the first aspect through the eleventh aspect, the techniques of the first aspect includes obtaining the at least one weight factor by selecting the at least one weight factor from a plurality of RRC-configured values based on a range of the first size and a range of the second size when the sum of the first size of the HP UCI message and the second size of the LP UCI message is within a first range.

In a thirteenth aspect, alone or in combination with the twelfth aspect, the techniques of the first aspect includes calculating the at least one weight factor based on a ratio of a coding rate associated with the LP UCI message to a coding rate associated with the HP UCI message when the sum of the first size of the HP UCI message and the second size of the LP UCI message is within a second range different from the first range.

In a fourteenth aspect, alone or in combination with one or more of the first aspect through the thirteenth aspect, determining the reference total UCI payload size based on the first size of the HP UCI message and the second size of the LP UCI message includes calculating a sum of the first size and a reference second size.

In a fifteenth aspect, alone or in combination with the fourteenth aspect, the reference second size is different from the second size of the LP UCI message.

In a sixteenth aspect, alone or in combination with one or more of the first aspect through the fifteenth aspect, calculating the sum of the first size and the reference second size for determining the reference total UCI payload size includes excluding the second size of the LP UCI message in the sum of the first size and the reference second size.

In a seventeenth aspect, alone or in combination with one or more of the first aspect through the sixteenth aspect, determining the reference total UCI payload size based on the first size of the HP UCI message and the second size of the LP UCI message includes calculating a sum of the first size and a reference second size when the LP UCI message includes a dynamic Type 1 HARQ feedback message.

In an eighteenth aspect, alone or in combination with one or more of the first aspect through the seventeenth aspect, the reference second size is one of a fixed integer value, a quantized reference value, or a rounded value relative to the second size of the LP UCI message.

In a nineteenth aspect, alone or in combination with one or more of the first aspect through the eighteenth aspect, the quantized reference value is obtained by configuring a set of reference integer values.

In a twentieth aspect, alone or in combination with the nineteenth aspect, the quantized reference value is obtained by selecting an intermediate reference second size.

In a twenty-first aspect, alone or in combination with one or more of the nineteenth aspect through the twentieth aspect, the quantized reference value is obtained by rounding the intermediate reference second size to a largest value from the set of reference integer values that is less than the intermediate reference second size to obtain the quantized reference value.

In a twenty-second aspect, alone or in combination with one or more of the first aspect through the twenty-first aspect, the rounded value relative to the second size of the LP UCI message is obtained by obtaining a ceiling of a ratio of the second size of the LP UCI message to a rounding factor.

In a twenty-third aspect, alone or in combination with the twenty-second aspect, the rounded value relative to the second size of the LP UCI message is obtained by multiplying the ceiling of the ratio of the second size of the LP UCI message to a rounding factor by the rounding factor to obtain the rounded value.

In a twenty-fourth aspect, alone or in combination with one or more of the first aspect through the twenty-third aspect, the techniques of the first aspect include determining a total number of RB s to be used for the transmitting the multiplexed PUCCH transmission in the resource selected from the resource set based, at least in part, on the first size of the HP UCI message and the reference second size.

In a twenty-fifth aspect, alone or in combination with one or more of the first aspect through the twenty-fourth aspect, determining the total number of RBs includes calculating an LP RB size based on the reference second size and a coding rate associated with the LP UCI message.

In a twenty-sixth aspect, alone or in combination with the twenty-fifth aspect, determining the total number of RBs includes calculating an HP RB size based on the first size of the HP UCI message and a coding rate associated with the HP UCI message.

In a twenty-seventh aspect, alone or in combination with one or more of the twenty-fifth aspect through the twenty-sixth aspect, determining the total number of RBs includes obtaining the total number of RBs to be used for the transmitting the multiplexed PUCCH transmission in the resource selected from the resource set based on a sum of the LP RB size and the HP RB size.

In a twenty-eighth aspect, alone or in combination with one or more of the first aspect through the twenty-seventh aspect, calculating the LP RB size includes determining an integer number of RBs for the LP UCI message.

In a twenty-ninth aspect, alone or in combination with the twenty-eighth aspect, calculating the HP RB size includes determining an integer number of RBs for the HP UCI message.

In a thirtieth aspect, alone or in combination with one or more of the first aspect through the twenty-ninth aspect, the calculated LP RB size is a non-integer value and the calculated HP RB size is a non-integer value, and wherein obtaining the total number of RBs includes rounding the sum of the LP RB size and the HP RB size to an integer value.

In a thirty-first aspect, alone or in combination with one or more of the first aspect through the thirtieth aspect, the HP UCI message is originally configured to be transmitted in a PUCCH resource of an HP resource set, the LP UCI message is originally configured to be transmitted in a PUCCH resource of an LP resource set, and the resource set from which to select the resource for the multiplexed PUCCH transmission is the HP resource set.

In a thirty-second aspect, supporting PUCCH resource set determination for multiplexing UCI messages of different priorities in a wireless communication system may include an apparatus configured to determine a configuration of at least one resource set including at least one resource configured for a multiplexed PUCCH transmission, from a UE to the network entity, that includes an HP UCI message having a first size and an LP UCI message having a second size, the configuration of the at least one resource set based on a total UCI payload size range associated with a reference total UCI payload size that is different from a sum of the first size and the second size, to transmit, to the UE, the configuration of the at least one resource set including the at least one resource configured for the multiplexed PUCCH transmission from the UE, and to receive, from the UE, the multiplexed PUCCH transmission in the at least one resource of the at least one resource set. Additionally, the apparatus may perform or operate according to one or more aspects as described below. In some implementations, the apparatus includes a wireless device, such as a base station or other network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-third aspect, alone or in combination with one or more of the thirty-second aspect through the thirty-second aspect, the configuration of the at least one resource set includes at least one weight factor for calculating a weighted sum of the first size and the second size by the UE.

In a thirty-fourth aspect, alone or in combination with the thirty-third aspect, the UE is configured to determine the resource set from which to select the resource for the multiplexed PUCCH transmission by determining the reference total UCI payload size based on the weighted sum of the first size and the second size based on at least one weight factor.

In a thirty-fifth aspect, alone or in combination with one or more of the thirty-second aspect through the thirty-third aspect, the techniques of the thirty-second aspect include transmitting, to the UE, a plurality of RRC-configured weight factor values.

In a thirty-sixth aspect, alone or in combination with the thirty-fifth aspect, each weight factor value of the plurality of radio RRC-configured weight factor values is associated with a range of the first size and a range of the second size.

In a thirty-seventh aspect, alone or in combination with one or more of the thirty-second aspect through the thirty-sixth aspect, the at least one weight factor is based on a ratio of a coding rate associated with the LP UCI message to a coding rate associated with the HP UCI message.

In a thirty-eighth aspect, alone or in combination with one or more of the thirty-second aspect through the thirty-seventh aspect, the coding rate associated with the LP UCI message is determined based on a coding rate of a PUCCH resource over which the LP UCI message is originally scheduled to be transmitted.

In a thirty-ninth aspect, alone or in combination with one or more of the thirty-second aspect through the thirty-eighth aspect, the coding rate associated with the HP UCI message is determined based on a coding rate of a PUCCH resource over which the HP UCI message is originally scheduled to be transmitted.

In a fortieth aspect, alone or in combination with one or more of the thirty-second aspect through the thirty-ninth aspect, determining the configuration of at least one resource set includes configuring the at least one resource set to be associated with the reference total UCI payload size, the reference total UCI payload size based on a sum of the first size of the HP UCI message and a reference second size.

In a forty-first aspect, alone or in combination with one or more of the thirty-second aspect through the fortieth aspect, the reference second size is different from the second size of the LP UCI message.

In a forty-second aspect, alone or in combination with one or more of the thirty-second aspect through the forty-first aspect, the sum of the first size and the reference second size excludes the second size of the LP UCI message in the sum of the first size and the reference second size.

In a forty-third aspect, alone or in combination with one or more of the thirty-second aspect through the forty-second aspect, the LP UCI message includes a dynamic Type 1 HARQ feedback message.

In a forty-fourth aspect, alone or in combination with one or more of the thirty-second aspect through the forty-third aspect, the techniques of the thirty-second aspect include determining a total number of RBs to be used by the UE for the multiplexed PUCCH transmission based, at least in part, on the first size of the HP UCI message and the reference second size.

In a forty-fifth aspect, alone or in combination with one or more of the thirty-second aspect through the forty-fourth aspect, determining the total number of RBs includes calculating an LP RB size based on the reference second size and a coding rate associated with a PUCCH resource over which the LP UCI message is originally scheduled to be transmitted.

In a forty-sixth aspect, alone or in combination with the forty-fifth aspect, determining the total number of RBs includes calculating an HP RB size based on the first size of the HP UCI message and a coding rate associated with a PUCCH resource over which the HP UCI message is originally scheduled to be transmitted.

In a forty-seventh aspect, alone or in combination with one or more of the forty-fifth aspect through the forty-sixth aspect, determining the total number of RBs includes obtaining the total number of RBs to be used by the UE for the multiplexed PUCCH transmission in the resource selected from the resource set based on a sum of the LP RB size and the HP RB size.

In a forty-eighth aspect, alone or in combination with one or more of the thirty-second aspect through the forty-seventh aspect, the HP UCI message is originally configured to be transmitted in a PUCCH resource of an HP resource set, the LP UCI message is originally configured to be transmitted in a PUCCH resource of an LP resource set, and the resource set from which the resource over which the multiplexed PUCCH transmission is received from the UE is the HP resource set.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), a graphics processing unit (GPU), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), flash memory, phase change memory, electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

determining to multiplex a high-priority (HP) uplink control information (UCI) message having a first size and a low-priority (LP) UCI message having a second size for a multiplexed physical uplink control channel (PUCCH) transmission;

determining a reference total UCI payload size based on the first size of the HP UCI message and the second size of the LP UCI message, wherein the reference total UCI payload size is different from a sum of the first size and the second size, wherein determining the reference total UCI payload size includes calculating a weighted sum of the first size and the second size based on at least one weight factor, the calculating including at least one of:

applying the at least one weight factor to the first size and adding a result of applying the at least one weight factor to the first size to the second size to determine the weighted sum; or applying a first weight factor of the at least one weight factor to the first size and a second weight factor of the at least one weight factor to the second size, and adding a result of applying the first weight factor to the first size to a result of applying the second weight factor to the second size to determine the weighted sum;

determining, based on the reference total UCI payload size, a resource for the multiplexed PUCCH transmission including the HP UCI message and the LP UCI message; and transmitting, to a network entity, the multiplexed PUCCH transmission in the resource.

2. The method of claim 1, wherein calculating the weighted sum of the first size and the second size based on at least one weight factor further includes applying the at least one weight factor to the second size and adding a result of applying the at least one weight factor to the second size to the first size to determine the weighted sum.

3. The method of claim 1, wherein:

applying the at least one weight factor to the first size includes obtaining a weighted first size based on the at least one weight factor and rounding the weighted first size to a first integer value; and applying the at least one weight factor to the second size includes obtaining a weighted second size based on the at least one weight factor and rounding the weighted second size to a second integer value.

4. The method of claim 1, further comprising obtaining the at least one weight factor by selecting the at least one weight factor from a plurality of radio resource control (RRC)-configured values based on a range of the first size and a range of the second size.

5. The method of claim 1, further comprising obtaining the at least one weight factor by calculating the at least one weight factor based on a ratio of a coding rate associated with the LP UCI message to a coding rate associated with the HP UCI message.

6. The method of claim 5, wherein the coding rate associated with the LP UCI message is determined based on a coding rate of a PUCCH resource over which the LP UCI message is originally scheduled to be transmitted, and wherein the coding rate associated with the HP UCI message is determined based on a coding rate of a PUCCH resource over which the HP UCI message is originally scheduled to be transmitted.

7. The method of claim 1, further comprising obtaining the at least one weight factor by selecting the at least one weight factor from a plurality of radio resource control (RRC)-configured values based on a range of the first size and a range of the second size when the sum of the first size of the HP UCI message and the second size of the LP UCI message is within a first range, and calculating the at least one weight factor based on a ratio of a coding rate associated with the LP UCI message to a coding rate associated with the HP UCI message when the sum of the first size of the HP UCI message and the second size of the LP UCI message is within a second range different from the first range.

8. The method of claim 1, wherein determining the reference total UCI payload size based on the first size of the HP UCI message and the second size of the LP UCI message includes calculating a sum of the first size and a reference second size, wherein the reference second size is different from the second size of the LP UCI message.

9. The method of claim 8, wherein calculating the sum of the first size and the reference second size for determining the reference total UCI payload size includes excluding the second size of the LP UCI message in the sum of the first size and the reference second size.

10. The method of claim 9, wherein determining the reference total UCI payload size based on the first size of the HP UCI message and the second size of the LP UCI message includes calculating a sum of the first size and a reference second size when the LP UCI message includes a dynamic Type 1 hybrid automatic repeat request (HARQ) feedback message.

11. The method of claim 8, wherein the reference second size is one of:

a fixed integer value;

a quantized reference value; or a rounded value relative to the second size of the LP UCI message.

12. The method of claim 11, wherein the quantized reference value is obtained by:

configuring a set of reference integer values;

selecting an intermediate reference second size; and rounding the intermediate reference second size to a largest value from the set of reference integer values that is less than the intermediate reference second size to obtain the quantized reference value.

13. The method of claim 11, wherein the rounded value relative to the second size of the LP UCI message is obtained by:

obtaining a ceiling of a ratio of the second size of the LP UCI message to a rounding factor; and multiplying the ceiling of the ratio of the second size of the LP UCI message to a rounding factor by the rounding factor to obtain the rounded value.

14. The method of claim 8, further comprising:

determining a total number of resource blocks (RBs) to be used for the transmitting the multiplexed PUCCH transmission in the resource based, at least in part, on the first size of the HP UCI message and the reference second size.

15. The method of claim 14, wherein determining the total number of RBs includes:

calculating an LP RB size based on the reference second size and a coding rate associated with the LP UCI message;

calculating an HP RB size based on the first size of the HP UCI message and a coding rate associated with the HP UCI message; and obtaining the total number of RBs to be used for the transmitting the multiplexed PUCCH transmission in the resource based on a sum of the LP RB size and the HP RB size.

16. The method of claim 15, wherein:

calculating the LP RB size includes determining an integer number of RBs for the LP UCI message; and calculating the HP RB size includes determining an integer number of RBs for the HP UCI message.

17. The method of claim 15, wherein the calculated LP RB size is a non-integer value and the calculated HP RB size is a non-integer value, and wherein obtaining the total number of RBs includes rounding the sum of the LP RB size and the HP RB size to an integer value.

18. The method of claim 1, wherein determining the resource for the multiplexed PUCCH transmission includes:

determining, based on the reference total UCI payload size, a resource set; and selecting, from the resource set determined based on the reference total UCI payload size, the resource for the multiplexed PUCCH transmission.

19. A method of wireless communication performed by a network entity, the method comprising:

determining a configuration of at least one resource set including at least one resource configured for a multiplexed physical uplink control channel (PUCCH) transmission, from a user equipment (UE) to the network entity, that includes a high-priority (HP) uplink control information (UCI) message having a first size and a low-priority (LP) UCI message having a second size, the configuration of the at least one resource set based on a total UCI payload size range associated with a reference total UCI payload size that is different from a sum of the first size and the second size, wherein the reference total UCI payload size corresponds to a weighted sum of the first size and the second size based on at least one weight factor, determination of the weighted sum including at least one of:

an application of the at least one weight factor to the first size and adding a result of the application of the at least one weight factor to the first size to the second size to determine the weighted sum; or an application of a first weight factor of the at least one weight factor to the first size and a second weight factor of the at least one weight factor to the second size, and adding a result of the application of the first weight factor to the first size to a result of the application of the second weight factor to the second size to determine the weighted sum;

transmitting, to the UE, the configuration of the at least one resource set including the at least one resource configured for the multiplexed PUCCH transmission from the UE; and receiving, from the UE, the multiplexed PUCCH transmission in the at least one resource of the at least one resource set.

20. The method of claim 19, wherein the configuration of the at least one resource set includes the at least one weight factor for calculating the weighted sum of the first size and the second size by the UE, wherein the UE is configured to determine the resource set from which to select the resource for the multiplexed PUCCH transmission, or to determine the resource for the multiplexed PUCCH transmission, by determining the reference total UCI payload size based on the weighted sum of the first size and the second size based on at least one weight factor.

21. The method of claim 20, further comprising:

transmitting, to the UE, a plurality of radio resource control (RRC)-configured weight factor values, wherein each weight factor value of the plurality of RRC-configured weight factor values is associated with a range of the first size and a range of the second size.

22. The method of claim 20, wherein the at least one weight factor is based on a ratio of a coding rate associated with the LP UCI message to a coding rate associated with the HP UCI message, wherein the coding rate associated with the LP UCI message is determined based on a coding rate of a PUCCH resource over which the LP UCI message is originally scheduled to be transmitted, and wherein the coding rate associated with the HP UCI message is determined based on a coding rate of a PUCCH resource over which the HP UCI message is originally scheduled to be transmitted.

23. The method of claim 19, wherein determining the configuration of at least one resource set includes:

configuring the at least one resource set to be associated with the reference total UCI payload size, the reference total UCI payload size based on a sum of the first size of the HP UCI message and a reference second size, wherein the reference second size is different from the second size of the LP UCI message.

24. The method of claim 23, wherein the sum of the first size and the reference second size excludes the second size of the LP UCI message in the sum of the first size and the reference second size.

25. The method of claim 24, wherein the LP UCI message includes a dynamic Type 1 hybrid automatic repeat request (HARQ) feedback message.

26. The method of claim 23, further comprising:

determining a total number of resource blocks (RBs) to be used by the UE for the multiplexed PUCCH transmission based, at least in part, on the first size of the HP UCI message and the reference second size.

27. The method of claim 26, wherein determining the total number of RBs includes:

calculating an LP RB size based on the reference second size and a coding rate associated with a PUCCH resource over which the LP UCI message is originally scheduled to be transmitted;

calculating an HP RB size based on the first size of the HP UCI message and a coding rate associated with a PUCCH resource over which the HP UCI message is originally scheduled to be transmitted; and obtaining the total number of RBs to be used by the UE for the multiplexed PUCCH transmission in the resource selected from the resource set based on a sum of the LP RB size and the HP RB size.

28. An apparatus for wireless communication at a user equipment (UE), the apparatus comprising:

at least one processor; and a memory coupled with the at least one processor and storing processor-readable code that, when executed by the at least one processor, configures the UE to perform operations including:

determining to multiplex a high-priority (HP) uplink control information (UCI) message having a first size and a low-priority (LP) UCI message having a second size for a multiplexed physical uplink control channel (PUCCH) transmission;

determining a reference total UCI payload size based on the first size of the HP UCI message and the second size of the LP UCI message, wherein the reference total UCI payload size is different from a sum of the first size and the second size, wherein determining the reference total UCI payload size includes calculating a weighted sum of the first size and the second size based on at least one weight factor, the calculating including at least one of:

applying the at least one weight factor to the first size and adding a result of applying the at least one weight factor to the first size to the second size to determine the weighted sum; or applying a first weight factor of the at least one weight factor to the first size and a second weight factor of the at least one weight factor to the second size, and adding a result of applying the first weight factor to the first size to a result of applying the second weight factor to the second size to determine the weighted sum;

determining, based on the reference total UCI payload size, a resource for the multiplexed PUCCH transmission including the HP UCI message and the LP UCI message; and transmitting, to a network entity, the multiplexed PUCCH transmission in the resource.

29. An apparatus for wireless communication at a network entity, the apparatus comprising:

at least one processor; and a memory coupled with the at least one processor and storing processor-readable code that, when executed by the at least one processor, configures the network entity to perform operations including:

determining a configuration of at least one resource set including at least one resource configured for a multiplexed physical uplink control channel (PUCCH) transmission, from a user equipment (UE) to the network entity, that includes a high-priority (HP) uplink control information (UCI) message having a first size and a low-priority (LP) UCI message having a second size, the configuration of the at least one resource set based on a total UCI payload size range associated with a reference total UCI payload size that is different from a sum of the first size and the second size, wherein the reference total UCI payload size corresponds to a weighted sum of the first size and the second size based on at least one weight factor, determination of the weighted sum including at least one of:

an application of the at least one weight factor to the first size and adding a result of the application of the at least one weight factor to the first size to the second size to determine the weighted sum; or an application of a first weight factor of the at least one weight factor to the first size and a second weight factor of the at least one weight factor to the second size, and adding a result of the application of the first weight factor to the first size to a result of the application of the second weight factor to the second size to determine the weighted sum;

transmitting, to the UE, the configuration of the at least one resource set including the at least one resource configured for the multiplexed PUCCH transmission from the UE; and receiving, from the UE, the multiplexed PUCCH transmission in the at least one resource of the at least one resource set.

* * * * *